United States Patent
Littlefield et al.

(10) Patent No.: US 11,525,528 B2
(45) Date of Patent: Dec. 13, 2022

(54) COMPOSITE TRANSITION FITTING

(71) Applicant: IPEX TECHNOLOGIES INC., Oakville (CA)

(72) Inventors: Jeffrey Vincent Littlefield, Brantford (CA); Qing Li, Oakville (CA); Filippo Martino, Oakville (CA)

(73) Assignee: IPEX TECHNOLOGIES INC., Mississaugag (CA)

( * ) Notice: Subject to any disclaimer, the term of this patent is extended or adjusted under 35 U.S.C. 154(b) by 217 days.

(21) Appl. No.: 16/897,594

(22) Filed: Jun. 10, 2020

(65) Prior Publication Data

US 2020/0408338 A1    Dec. 31, 2020

(30) Foreign Application Priority Data

Jun. 28, 2019    (CA) ...................................... 3048214

(51) Int. Cl.
| | |
|---|---|
| *F16L 25/06* | (2006.01) |
| *F16L 15/00* | (2006.01) |
| *F16L 15/06* | (2006.01) |
| *B29C 70/68* | (2006.01) |
| *B29L 31/24* | (2006.01) |
| *B29K 27/06* | (2006.01) |
| *B29L 31/26* | (2006.01) |

(52) U.S. Cl.
CPC .......... *F16L 15/003* (2013.01); *B29C 70/681* (2013.01); *F16L 15/06* (2013.01); *F16L 25/06* (2013.01); *B29K 2027/06* (2013.01); *B29L 2031/24* (2013.01); *B29L 2031/26* (2013.01)

(58) Field of Classification Search
CPC . F16L 21/00; F16L 21/08; F16L 25/06; F16L 47/005; F16L 47/12
USPC ......................... 285/282, 286.1, 294.4, 295.3
See application file for complete search history.

(56) References Cited

U.S. PATENT DOCUMENTS

| | | | | |
|---|---|---|---|---|
| 3,782,419 A | * | 1/1974 | Hanson ................. | F16L 25/023 285/47 |
| 4,905,766 A | * | 3/1990 | Dietz ..................... | F16L 47/24 285/239 |

(Continued)

FOREIGN PATENT DOCUMENTS

CN    103867819    6/2014

*Primary Examiner* — David Bochna

(57) ABSTRACT

A pipe fitting having a first body and a second body that together at least partially define a fluid flow passage. The first body defines a first portion of the fluid flow passage that extends from a first end of the fluid flow passage to a first internal opening. The second body defines a second portion of the fluid flow passage that extends from a second internal opening to a second end of the fluid flow passage. The first body has a first interface surface that surrounds the first internal opening, the first interface surface having a plurality of anti-rotation grooves. The second body has a second interface surface that surrounds the second internal opening and engages with the first interface surface. The first internal opening is in fluid communication with the second internal opening. The second interface surface has a plurality of anti-rotation fingers that are each received by and engage with a corresponding one of the anti-rotation grooves. Rotation of the second body relative to the first body is resisted by the engagement of the anti-rotation fingers with the anti-rotation grooves.

26 Claims, 15 Drawing Sheets

(56) References Cited

U.S. PATENT DOCUMENTS

| | | | |
|---|---|---|---|
| 5,437,481 A | | 8/1995 | Spears et al. |
| 5,918,913 A | * | 7/1999 | Lewis ................. F16L 37/0985 |
| | | | 285/239 |
| 8,172,275 B2 | | 5/2012 | Sumrall, Jr. et al. |
| 9,169,953 B2 | * | 10/2015 | Cavagna ............... F16L 25/026 |
| 10,744,527 B2 | * | 8/2020 | Jackson ................. F16L 47/24 |
| 2018/0056318 A1 | | 3/2018 | Jackson |
| 2020/0056912 A1 | * | 2/2020 | Hammond ............. F16L 25/06 |

* cited by examiner

COMPOSITE TRANSITION FITTING

FIELD OF THE INVENTION

This invention relates to pipe fittings, and more particularly to composite transition fittings.

BACKGROUND OF THE INVENTION

Transition fittings are known in the prior art for fluidly connecting pipes that are made from different materials, such as metallic pipes and polymeric pipes. Transition fittings often incorporate a threaded portion, which may be made from a metal such as brass, and a non-threaded portion, which may be made from a polymeric material. The threaded portion may, for example, be adapted for attaching to a threaded metallic pipe, and the non-threaded portion may, for example, be adapted for attaching to a non-threaded polymeric pipe. When the fitting is installed between a metallic pipe and a polymeric pipe, the fitting allows fluid, such as water, to flow through the fitting from the metallic pipe to the polymeric pipe, or vice versa.

A disadvantage of transition fittings that incorporate metallic components, and in particular brass, is that machined brass components can be very expensive. Furthermore, brass often contains lead, which may leach into the water and potentially cause a health hazard. In addition, fittings that contain dissimilar metallic and polymeric materials may have an increased risk of leaking, due to a number of factors, including the wide spread in coefficients of thermal expansion of the different materials.

Transition fittings that are made from polymeric materials only are also known in the prior art. For example, U.S. Pat. No. 8,172,275 to Sumrall, Jr. et al., issued May 8, 2012, teaches a composite polymeric transition pipe fitting that includes a tubular main fitting body with a secondary tubular polymeric body that is molded into the main body, such that the main body extends around the secondary body.

A disadvantage of the transition fitting disclosed in U.S. Pat. No. 8,172,275 to Sumrall, Jr. et al. is that, because the secondary tubular polymeric body is molded into the main body, the dimensions of the secondary tubular polymeric body are limited by the dimensions of the main body.

SUMMARY OF THE INVENTION

It is an object of the present invention to provide an improved type of pipe fitting that at least partially overcomes some of the disadvantages of the prior art.

Accordingly, in one aspect the present invention resides in a pipe fitting comprising: a first body and a second body that together at least partially define a fluid flow passage; the first body defining a first portion of the fluid flow passage that extends from a first end of the fluid flow passage to a first internal opening; the second body defining a second portion of the fluid flow passage that extends from a second internal opening to a second end of the fluid flow passage; wherein the first body has a first interface surface that surrounds the first internal opening, the first interface surface having a plurality of anti-rotation grooves; wherein the second body has a second interface surface that surrounds the second internal opening and engages with the first interface surface, the first internal opening being in fluid communication with the second internal opening, and the second interface surface having a plurality of anti-rotation fingers that are each received by and engage with a corresponding one of the anti-rotation grooves; and wherein rotation of the second body relative to the first body is resisted by the engagement of the anti-rotation fingers with the anti-rotation grooves.

At least one advantage of the pipe fitting according to at least some embodiments of the present invention is that the anti-rotation fingers and anti-rotation grooves may improve the connection between the first and second bodies, which helps the fitting withstand the rotational forces that may be experienced during installation or removal of the fitting.

Furthermore, in at least some preferred embodiments, the arrangement of the anti-rotation grooves on the first interface surface allows the second body to be overmolded over the first body. This allows the second body to extend away from the first body, and to be formed in a shape that is at least partially independent of the shape of the first body. For example, in some embodiments of the invention, the second body may be formed to incorporate a spigot or a socket, without requiring any corresponding changes to the shape or size of the first body. This increases the number of manufacturing options that are available, and for example would allow a single molded shape of the first body to be used in conjunction with any number of different molds for the second body, providing spigots and sockets of various shapes and sizes.

Preferably, the first body has a cylindrical wall with a cylindrical outer surface and a cylindrical inner surface, and the first interface surface is a ring-shaped end surface of the cylindrical wall that spans between the cylindrical outer surface to the cylindrical inner surface. The cylindrical wall preferably includes an overlapping portion where the second body is overmolded over the first body. The first body also preferably includes a non-overlapping portion which is spaced from the second body. The non-overlapping portion may, for example, include a male or female threaded end portion for threadedly engaging with a threaded attachment, such as a brass pipe or the like.

At least one advantage of the first body having an overlapping portion and a non-overlapping portion is that the non-overlapping portion can be changed without requiring a corresponding change to the shape of the second body. For example, the first body could be formed to incorporate male or female threaded end portions of different sizes, while maintaining the same size and shape of the overlapping portion of the cylindrical wall. This would allow the same mold for the second body to be used in conjunction with any configuration of the first body, thus providing increased options and flexibility during manufacturing.

The cylindrical wall preferably has at least one circumferential groove that extends radially inwardly from the outer circumferential surface, and more preferably at least two circumferential grooves. The second body is preferably overmolded over the circumferential grooves, thereby forming circumferential fingers that extend into and engage with the circumferential grooves. The engagement of the circumferential grooves with the circumferential fingers helps to resist the second body being separated from the first body.

Preferably, at least one of the circumferential grooves carries a resiliently compressible o-ring, which provides a fluid tight seal between the cylindrical wall and the second body. This helps to prevent fluid from leaking out of the fitting through the space between the first body and the second body.

Preferably, the first body is made from a first polymeric material that is suitable for attachment to a metallic pipe, such as glass-filled polyvinylidene fluoride. Also preferably the second body is formed from a second polymeric material that is different from the first polymeric material, such as polymeric materials that are suitable for attachment to a polymeric pipe, including chlorinated polyvinyl chloride.

Preferably, the anti-rotation grooves are oriented in a substantially parallel pattern on the first interface surface.

In some embodiments, the first body has a cylindrical wall with a cylindrical outer surface, a cylindrical inner surface, and a ring-shaped end surface that connects the cylindrical outer surface to the cylindrical inner surface; wherein the cylindrical inner surface defines at least part of the first portion of the fluid flow passage; and wherein the ring-shaped end surface comprises the first interface surface.

Preferably, the cylindrical wall extends concentrically about a central axis; wherein the first internal opening comprises a circular opening; and wherein the central axis extends through a center of the circular opening.

In some embodiments, the end surface, which is preferably ring-shaped, comprises a top surface that is substantially perpendicular to the central axis; wherein each of the anti-rotation grooves has a first side surface, a second side surface, and a bottom surface; wherein the first side surface and the second side surface each extend axially inwardly from the top surface, the first side surface being spaced from and substantially parallel to the second side surface; wherein the bottom surface is spaced axially inwardly from the top surface and extends between the first side surface and the second side surface; and wherein the first side surface, the second side surface, the bottom surface and the groove end surface of each anti-rotation groove defines a groove cavity.

Optionally, the bottom surface of each of the anti-rotation grooves is substantially flat, and substantially parallel to the top surface. The first side surface and the second side surface optionally each have a substantially flat portion. The substantially flat portion of the first side surface and the substantially flat portion of the second side surface may, for example, be substantially perpendicular to the top surface. Optionally, the first side surface and the second side surface each have a rounded transition portion that connects the substantially flat portion to the top surface.

In some embodiments, the first interface surface has a bearing area where the anti-rotation grooves contact with the anti-rotation fingers to resist rotation of the second body about the central axis relative to the first body; wherein the bearing area is related to an expected magnitude of torque applied to the pipe fitting during installation of the pipe fitting according to the following equation: T=C×BA wherein T represents the expected magnitude of torque in pound inches, BA represents the bearing area in square inches, and C represents a constant in pounds per inch; and wherein the constant C is in a range from 2000 pounds per inch to 2400 pounds per inch. Optionally, each of the anti-rotation grooves has a vertical surface area that includes the first side surface and the second side surface; and wherein the bearing area is calculated as 50% of a sum of the vertical surface areas of the anti-rotation grooves. The constant C may, for example, be between 2100 pounds per inch and 2200 pounds per inch, or between 2125 pounds per inch and 2135 pounds per inch, or about 2129.17.

In some embodiments, each of the anti-rotation grooves has a width defined by a distance between the first side surface and the second side surface; wherein each of the anti-rotation grooves has a depth defined by an axial distance of the bottom surface from the top surface; and wherein a ratio of the width to the depth is, for example, in a range from 1.45 to 1.55, or between 1.50 and 1.52, or about 1.516. Optionally, the width of each of the anti-rotation grooves is substantially identical; and the depth of each of the anti-rotation grooves is substantially identical.

In some embodiments, the anti-rotation grooves each extend from the cylindrical outer surface of the cylindrical wall towards a central plane that contains the central axis and is substantially perpendicular to the anti-rotation grooves. The anti-rotation grooves may, for example, each have a groove end surface that extends axially inwardly from the top surface to the bottom surface, and that extends between the first side surface and the second side surface; and wherein the groove end surface of each of the anti-rotation grooves is spaced from the central plane, and spaced from the circular opening. Optionally, the anti-rotation grooves on a first side of the central plane are symmetrical relative to the anti-rotation grooves on a second side of the central plane. Optionally, there are at least 3 and no more than 11 of the anti-rotation grooves on each side of the central plane, or there are at least 5 and no more than 9 of the anti-rotation grooves on each side of the central plane, or there are 7 of the anti-rotation grooves on each side of the central plane. Preferably, the groove end surface of each of the anti-rotation grooves is rounded. The groove end surface of each of the anti-rotation grooves may, for example, be spaced a radial distance from the cylindrical inner surface; wherein the cylindrical wall has a wall thickness defined by a distance between the cylindrical outer surface and the cylindrical inner surface; and wherein a ratio of the radial distance to the wall thickness is greater than 0.3, or between 0.3 and 0.5, or between 0.35 and 0.45, or about 0.395. In some preferred embodiments, the radial distance of the groove end surface of each of the anti-rotation grooves from the circular opening is substantially equal.

Preferably, the second body has a cylindrical extension that extends concentrically about the central axis; and wherein the cylindrical extension has an inner extension surface that engages with the cylindrical outer surface of the cylindrical wall. The cylindrical wall preferably has at least one circumferential groove that extends radially inwardly from the cylindrical outer surface. The cylindrical extension is preferably overmolded over at least a portion of the cylindrical outer surface, including the at least one circumferential groove. The at least one circumferential groove optionally comprises a sealing groove that contains a resiliently compressible o-ring, the o-ring being configured to provide a fluid tight seal between the cylindrical wall and the cylindrical extension. Optionally, the cylindrical extension has a circumferential finger that extends radially inwardly from the inner extension surface; wherein the at least one circumferential groove comprises a retaining groove that receives and engages with the circumferential finger; and wherein axial movement of the second body relative to the first body is resisted by the engagement of the circumferential finger with the retaining groove.

Preferably, the second end of the fluid flow passage is axially spaced from the first body and/or the first end of the fluid flow passage is axially spaced from the second body.

Optionally, the first body has a threaded end portion for threadedly engaging with a threaded attachment; and wherein the threaded end portion defines the first end of the fluid flow passage. The threaded end portion may, for example, comprise a male threaded end portion or a female threaded end portion.

Optionally, the second body has a cylindrical end portion for engaging with a cylindrical attachment; and wherein the cylindrical end portion defines the second end of the fluid flow passage. The cylindrical end portion may, for example, comprise a spigot or a socket.

Preferably, the first body is formed from a first polymeric material, and the second body is formed from a second polymeric material; wherein the first polymeric material differs from the second polymeric material. The first polymeric material may, for example, comprise polyvinylidene fluoride, polyphenylene sulfide, polyvinyl chloride, chlorinated polyvinyl chloride, or polyphenylsulfone. Preferably, the first polymeric material contains reinforcing fibers. The reinforcing fibers may, for example, comprise glass fibers. The second polymeric material may, for example, comprise chlorinated polyvinyl chloride.

Preferably, the first body comprises a molded first body. The second body is preferably overmolded over at least a portion of the first body, including the first interface surface.

In preferred embodiments, the pipe fitting is a composite transition fitting for fluidly connecting, via the first portion and the second portion of the fluid flow passage, a first fluid conduit formed from a first material and a second fluid conduit formed from a second material which differs from the first material. Optionally, the first body connects to the first fluid conduit at the first end of the fluid flow passage, the first fluid conduit being formed from a metallic material; and wherein the second body connects to the second fluid conduit at the second end of the fluid flow passage, the second fluid conduit being formed from a polymeric material.

Preferably, the pipe fitting is lead-free and/or metal-free.

In some embodiments, the first body comprises an overlapping portion and a non-overlapping portion; wherein the second body is overmolded over the overlapping portion; wherein the second body is spaced from the non-overlapping portion; and wherein the first end of the fluid flow passage is defined by the non-overlapping portion. Optionally, the second body comprises an attachment portion and an extension portion; wherein the attachment portion is attached to the overlapping portion of the first body; wherein the extension portion is spaced from the first body; and wherein the second end of the fluid flow passage is defined by the extension portion.

In another aspect, the present invention resides in a method of producing a pipe fitting, the pipe fitting comprising: a first body and a second body that together at least partially define a fluid flow passage; the first body defining a first portion of the fluid flow passage that extends from a first end of the fluid flow passage to a first internal opening; the second body defining a second portion of the fluid flow passage that extends from a second internal opening to a second end of the fluid flow passage; wherein the first body has a first interface surface that radially surrounds the first internal opening, the first interface surface having a plurality of anti-rotation grooves; wherein the second body has a second interface surface that radially surrounds the second internal opening and engages with the first interface surface, the first internal opening being in fluid communication with the second internal opening, and the second interface surface having a plurality of anti-rotation fingers that are each received by and engage with a corresponding one of the anti-rotation grooves; and wherein rotation of the second body relative to the first body is resisted by the engagement of the anti-rotation fingers with the anti-rotation grooves; the method comprising: producing the first body; and overmolding the second body over at least a portion of the first body, including the first interface surface. Preferably, producing the first body comprises injection molding the first body.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE DRAWINGS

Preferred embodiments of the invention and its advantages can be understood by referring to the present drawings. In the present drawings, like numerals are used for like and corresponding parts of the accompanying drawings. Also, the following preferred embodiments and detailed description illustrate and describe non-limiting features of the invention.

Figure 1:
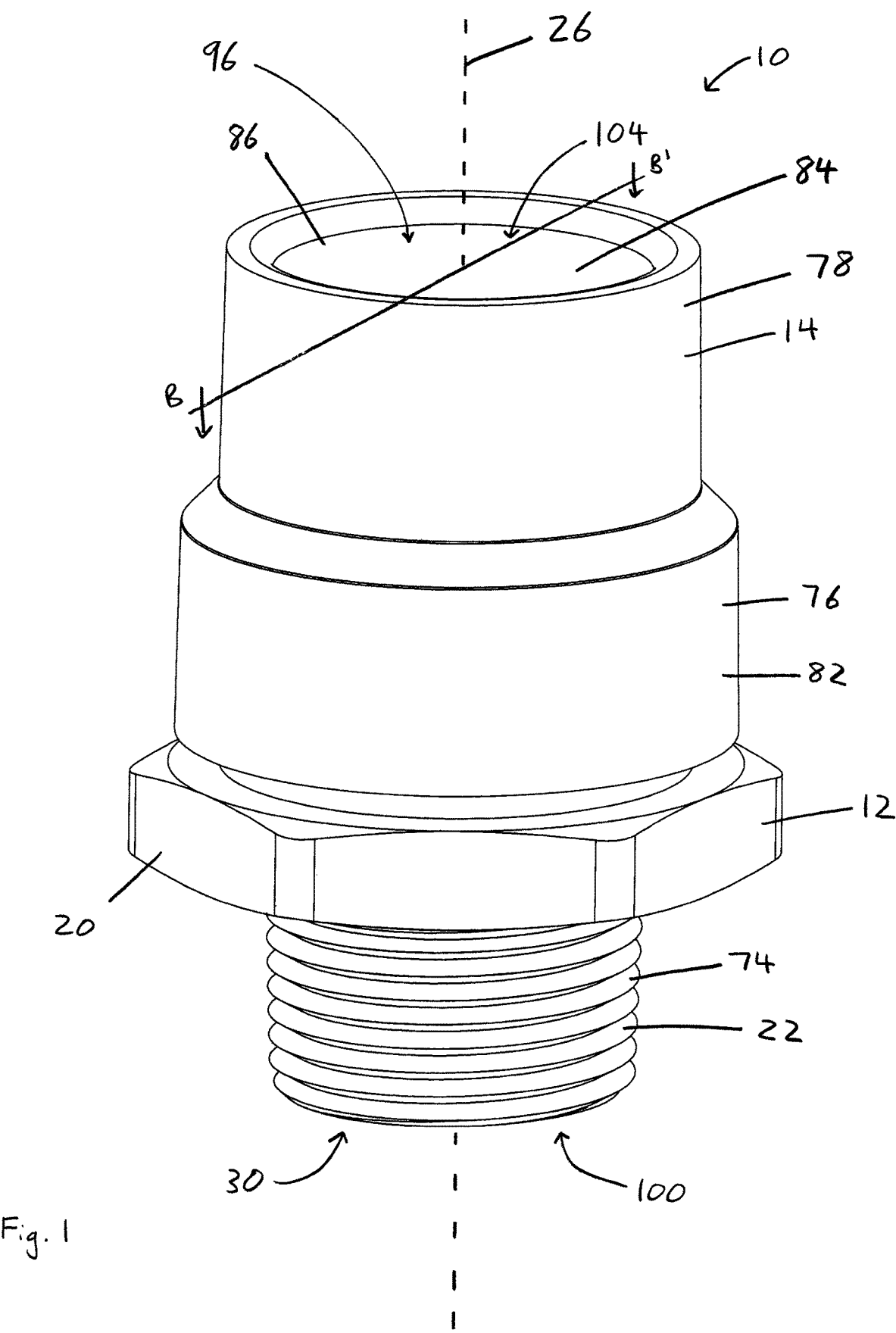
FIG. 1 is a perspective view of a pipe fitting in accordance with a first embodiment of the present invention.
Figure 2:
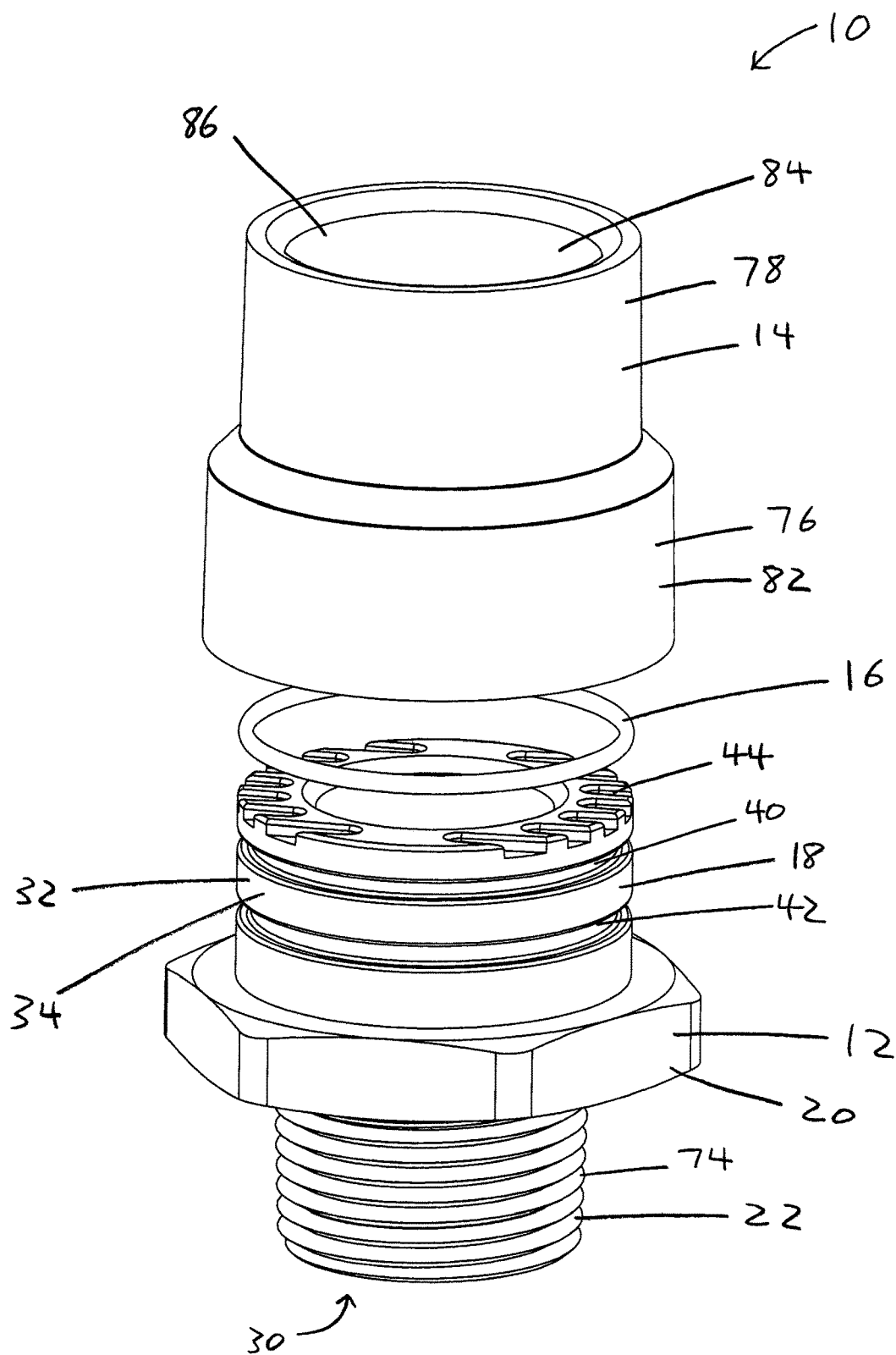
FIG. 2 is an exploded perspective view of the pipe fitting of FIG. 1, showing a first body, a second body, and an o-ring of the pipe fitting.

FIGS. 1 and 2 show a composite transition pipe fitting 10 in accordance with a first embodiment of the invention. As can be seen in FIG. 2, the pipe fitting 10 has a polymeric first body 12, a polymeric second body 14, and a resiliently compressible o-ring 16.

Figure 4:
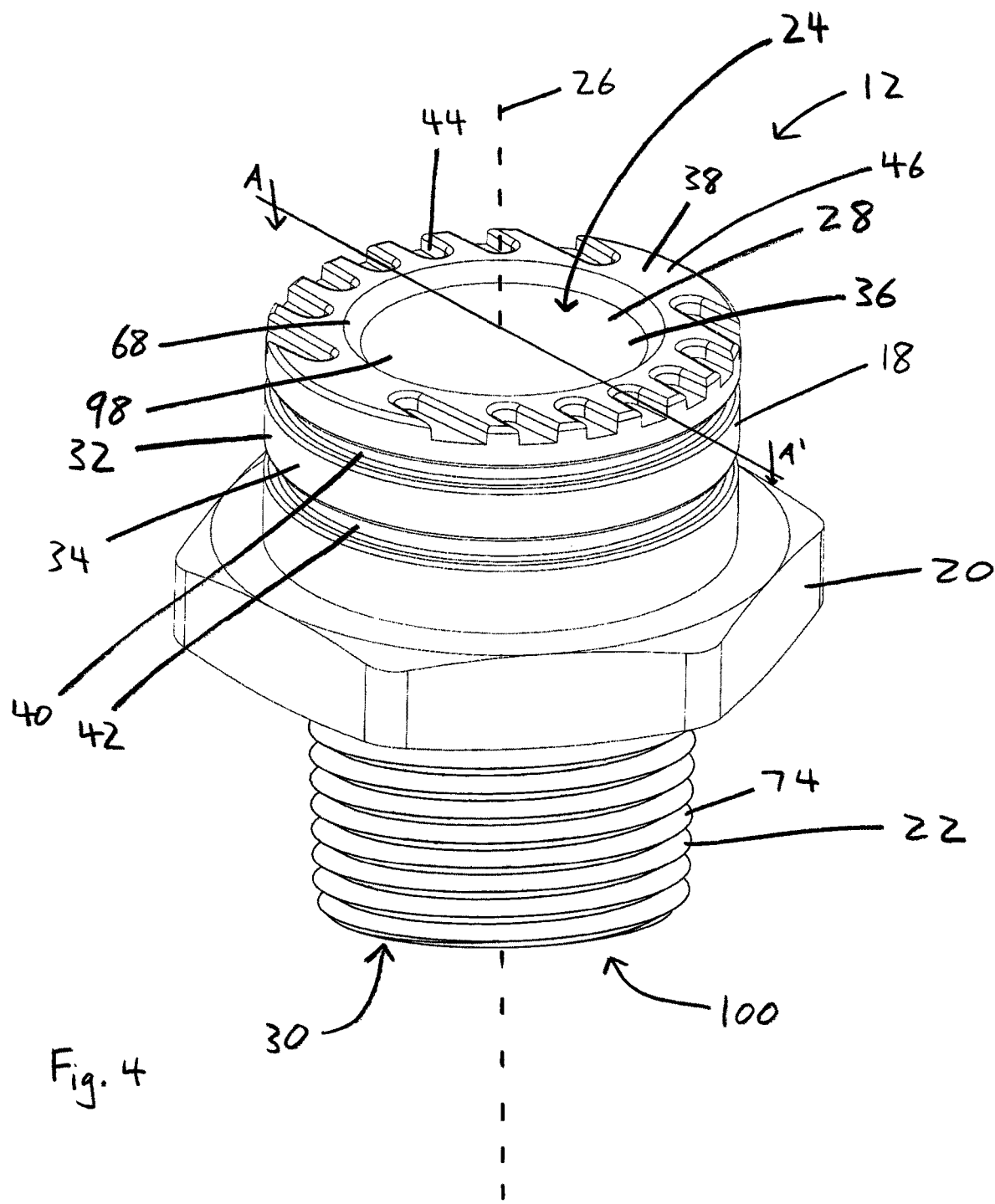
FIG. 4 is a perspective view of the first body shown in FIG. 2.
Figure 5:
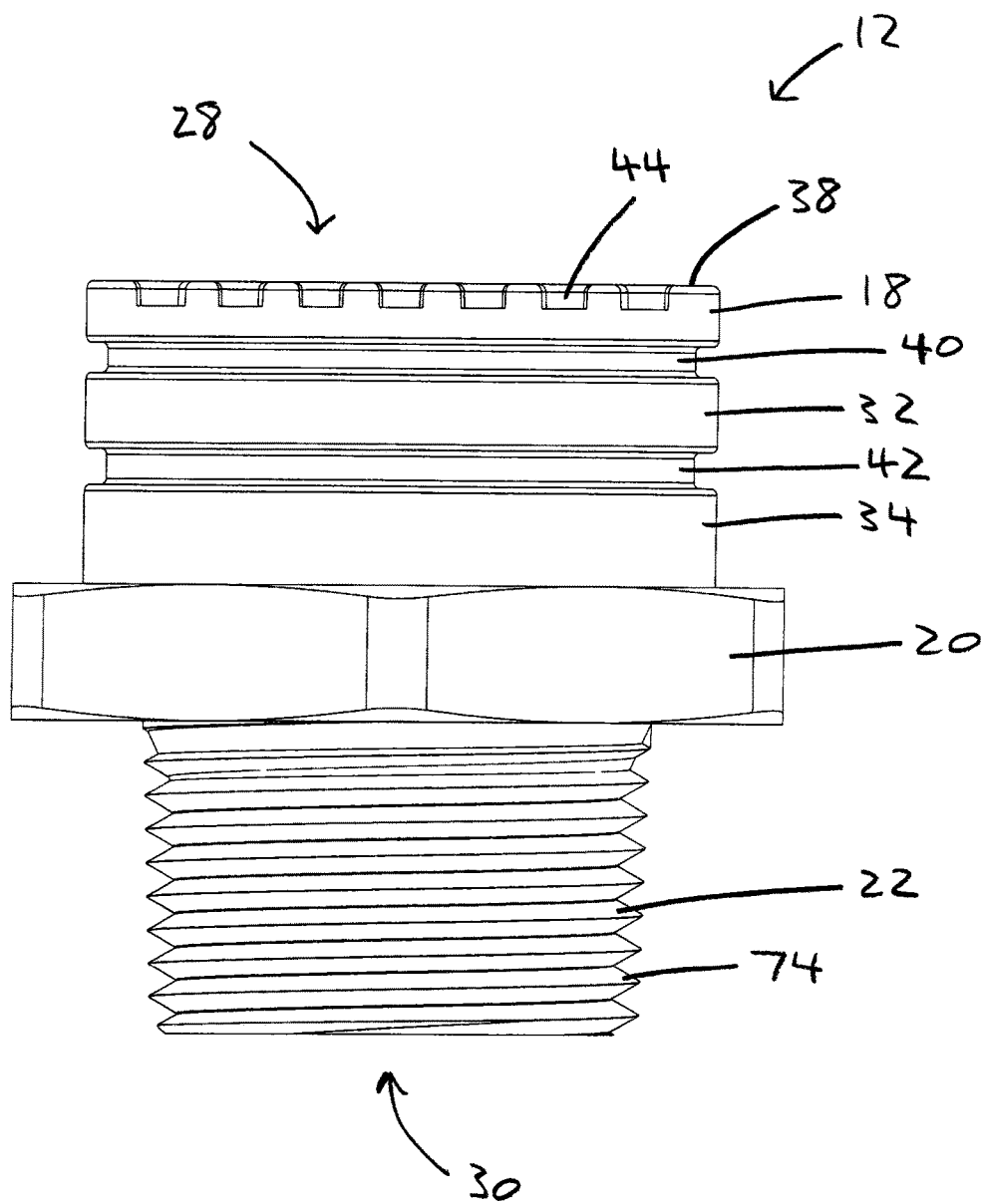
FIG. 5 is a side view of the first body shown in FIG. 4.
Figure 8:
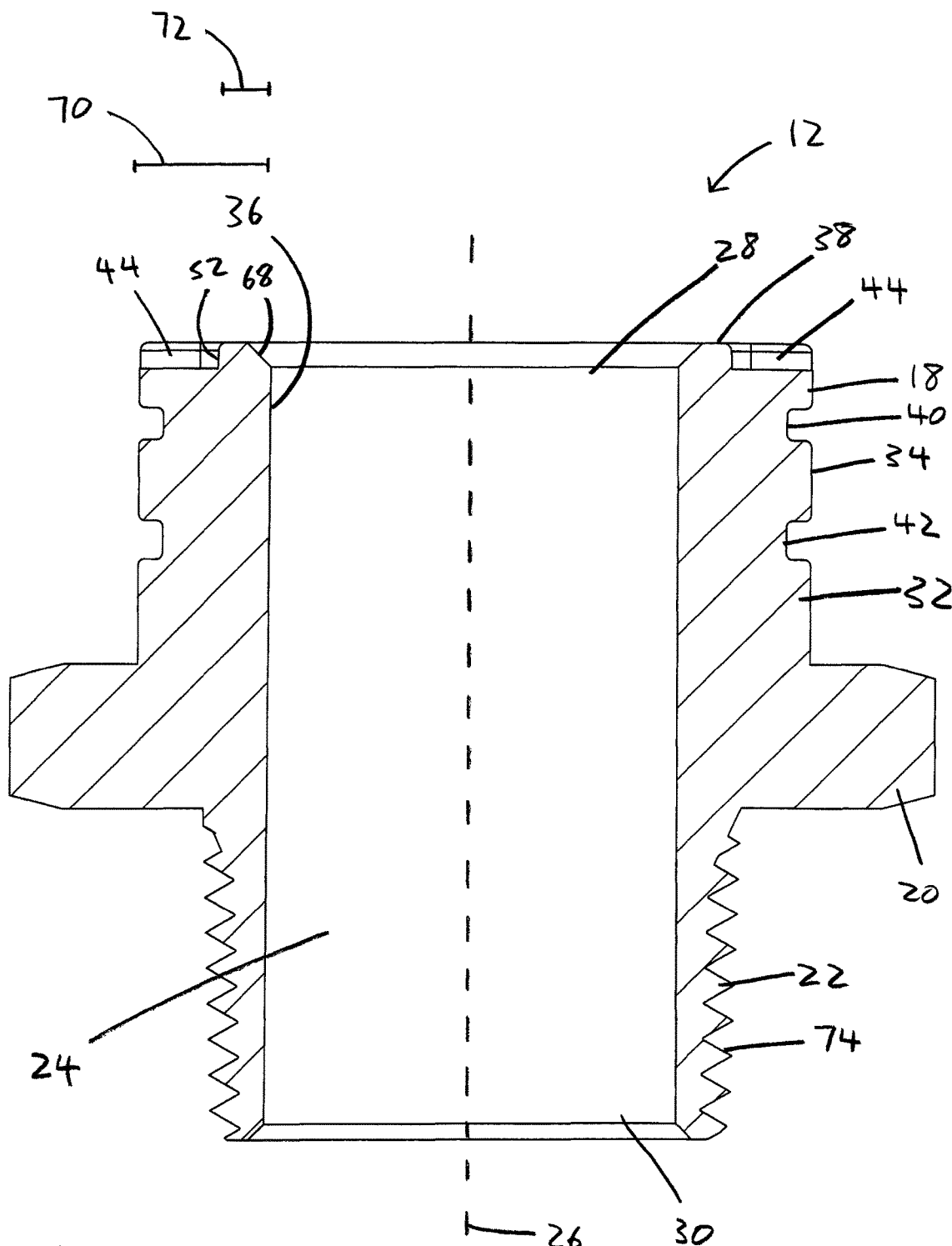
FIG. 8 is a cross-sectional view of the first body shown in FIG. 4, taken along line A-A' shown in FIG. 4.

The first body 12 is shown in FIGS. 4 and 5 as including an interface portion 18, a tool engagement portion 20, and a threaded end portion 22. As can be seen in FIG. 8, a cylindrical passageway 24 extends through the first body 12 along a central axis 26. The cylindrical passageway 24 has a first open end 28 that is defined by the interface portion 18 and a second open end 30 that is defined by the threaded end portion 22.

The interface portion 18 of the first body 12 has a wall 32 that extends about the central axis 26. As can be seen in FIG. 4, the wall 32 has an outer surface 34, an inner surface 36, and an end surface 38 that surrounds the first open end 28 of the cylindrical passageway 24 and spans between the outer surface 34 and the inner surface 36. The end surface 38 is also referred to herein as the first interface surface 38. Optionally, the wall 32 is a cylindrical wall 32 that extends concentrically about the central axis 26, as is shown in FIG. 4, although this is not necessary. In other embodiments, the wall 32 could have any desired shape, including for example an oval or square shape. With respect to the embodiment shown, in which the wall 32 is a cylindrical wall 32, the outer surface 34 is also referred to herein as a cylindrical outer surface 34; the inner surface 36 is also referred to herein as a cylindrical inner surface 36; and the end surface 38 is also referred to herein as a ring-shaped end surface 38. A first circumferential groove 40 and a second circumferential groove 42 extend radially inwardly from the cylindrical outer surface 34 towards the central axis 26, as can be seen in FIG. 5.

Figure 7:
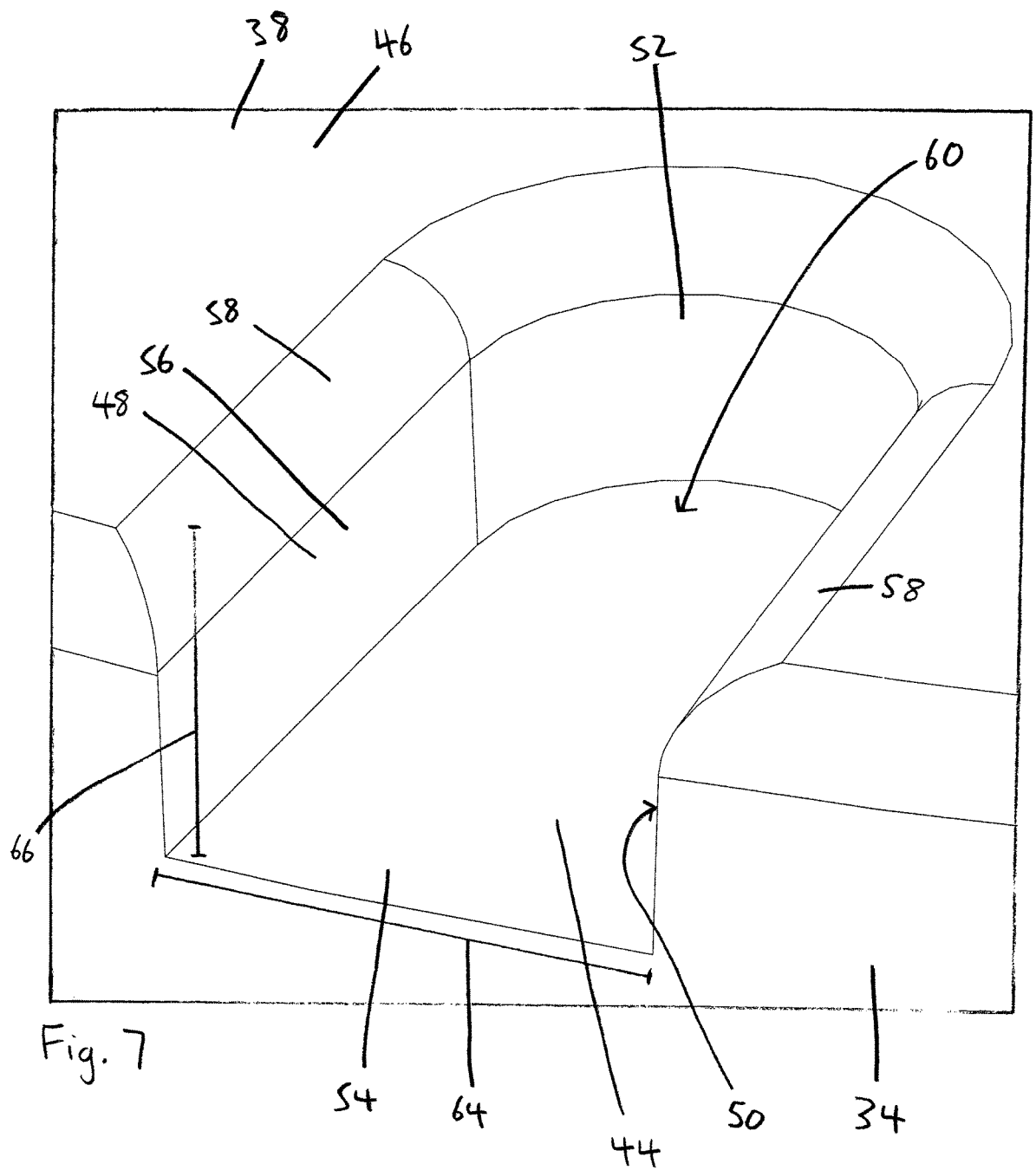
FIG. 7 is an enlarged view of an anti-rotation groove of the first body shown in FIG. 4.

As shown in FIG. 4, the ring-shaped end surface 38 has a top surface 46 that is substantially perpendicular to the central axis 26, and a plurality of anti-rotation grooves 44. As best seen in FIG. 7, each of the anti-rotation grooves 44 preferably has a first side surface 48, a second side surface 50, a groove end surface 52, and a bottom surface 54.

The first side surface 48 and the second side surface 50 each extend axially inwardly from the top surface 46, with the first side surface 48 being spaced from and substantially parallel to the second side surface 50. The first side surface 48 and the second side surface 50 each have a substantially flat portion 56 that is substantially perpendicular to the top surface 46, and a rounded transition portion 58 that connects the substantially flat portion 56 to the top surface 46.

The bottom surface 54 is spaced axially inwardly from the top surface 46, and extends between the first side surface 48 and the second side surface 50. Preferably, the bottom surface 54 is substantially flat, and substantially parallel to the top surface 46. The groove end surface 52 extends axially inwardly from the top surface 46 to the bottom surface 54, and extends between the first side surface 48 and the second side surface 50. The groove end surface 52 is preferably rounded. Together, the first side surface 48, the second side surface 50, the groove end surface 52, and the bottom surface 54 define a groove cavity 60.

Each of the anti-rotation grooves 54 have a width 64 defined by the distance between the first side surface 48 and the second side surface 50, as measured along the bottom surface 54, and a depth 66 defined by the axial distance of the bottom surface 54 from the top surface 46. Preferably, a ratio of the width 64 to the depth 66 is in a range from 1.45 to 1.55, or between 1.50 and 1.52, or about 1.516.

Figure 6:
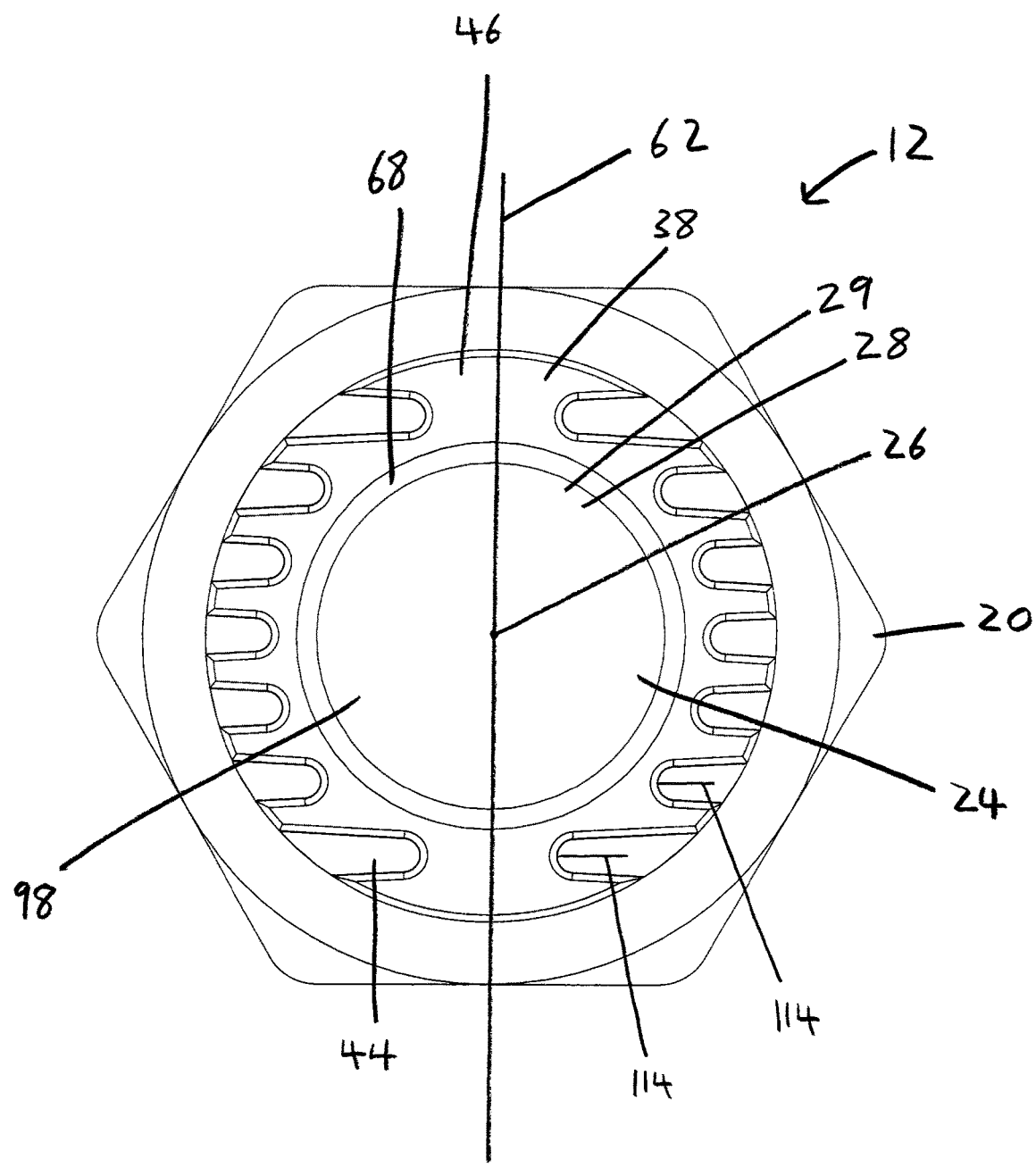
FIG. 6 is a top view of the first body shown in FIG. 4.

As can be seen in FIG. 6, the anti-rotation grooves 44 are preferably oriented in a substantially parallel pattern on the ring-shaped end surface 38, with each of the anti-rotation grooves 44 extending from the cylindrical outer surface 34 towards a central plane 62 that contains the central axis 26 and is substantially perpendicular to the anti-rotation grooves 44. In the embodiment shown, there are seven anti-rotation grooves 44 arranged on each side of the central plane 62, with the anti-rotation grooves 44 on a first side of the central plane 62 being substantially symmetrical relative to the anti-rotation grooves 44 on a second side of the central plane 62.

As can be seen in FIG. 6, the first open end 28 of the cylindrical passageway 24 is preferably a circular opening 29, with the central axis 26 extending through a center of the circular opening 29. A sloped transition surface 68 surrounds the circular opening 29, and connects the top surface 46 of the cylindrical wall 32 to the cylindrical inner surface 36, as shown in FIG. 8.

The groove end surface 52 of each anti-rotation groove 44 is spaced a radial distance 72 from the first open end 28. The radial distance 72 is measured as the distance between the groove end surface 52 and the cylindrical inner surface 36, as shown in FIG. 8. The cylindrical wall 32 has a wall thickness 70 defined by a distance between the cylindrical outer surface 34 and the cylindrical inner surface 36. Preferably, a ratio of the radial distance 72 to the wall thickness 70 is greater than 0.3, or between 0.3 and 0.5, or between 0.35 and 0.45, or about 0.395.

Figure 3:
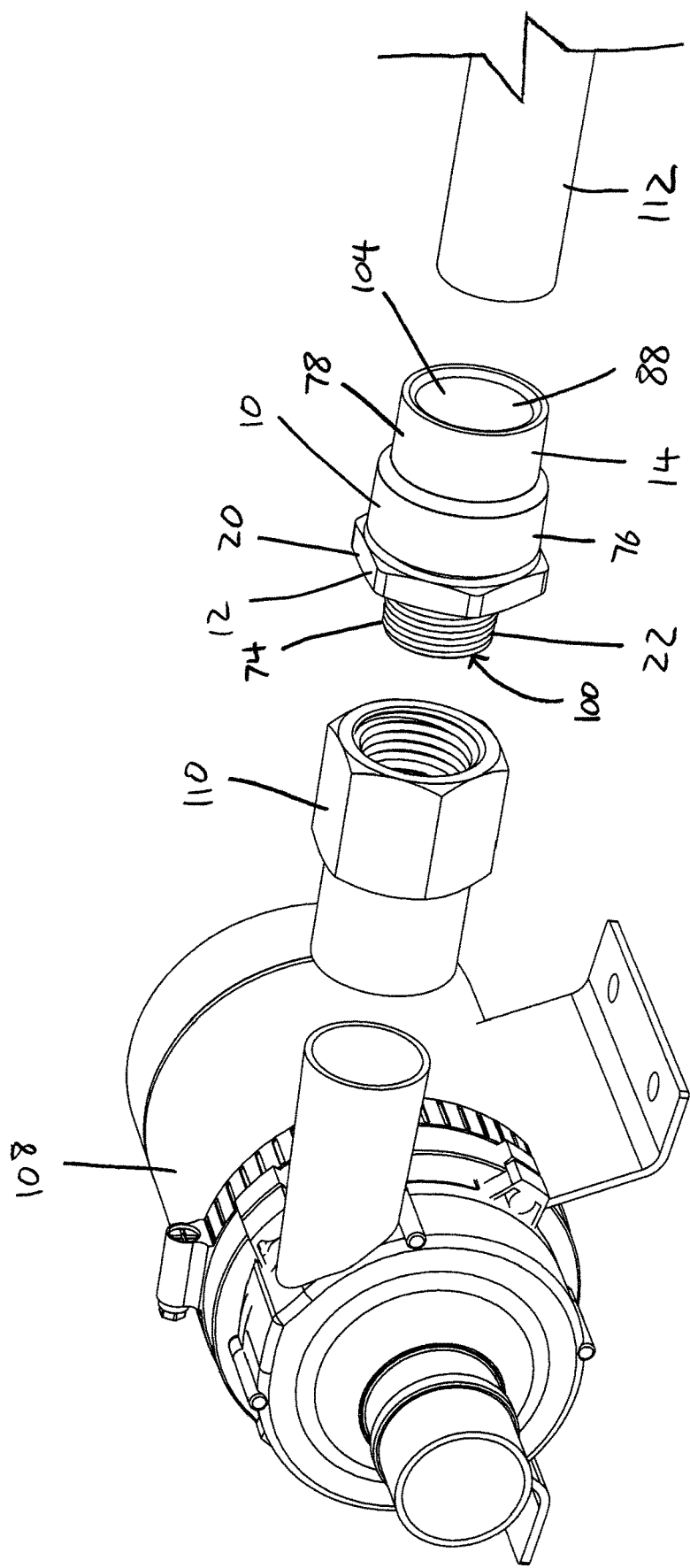
FIG. 3 is an exploded perspective view showing the pipe fitting of FIG. 1 positioned for attachment to a threaded fitting and a non-threaded polymeric pipe.

As can be seen in FIG. 3, the tool engagement portion 20 is positioned between the interface portion 18 and the threaded end portion 22 of the first body 12. The tool engagement portion 20 extends radially outwardly from the cylindrical wall 32, and has a generally hexagonal shape that is selected for engagement with a suitable tool such as a wrench or the like.

The threaded end portion 22 extends axially away from the tool engagement portion 20, and has a male threaded connection 74 for threadedly engaging with a suitable female threaded attachment. The male threaded connection 74 may have any suitable size and shape, and preferably incorporates molded tapered threads that conform to the national pipe thread (NTP) standards. Optionally, the threads may range in size from ½ inch to 2 inches, for example. Other thread sizes could also be used.

Figure 11:
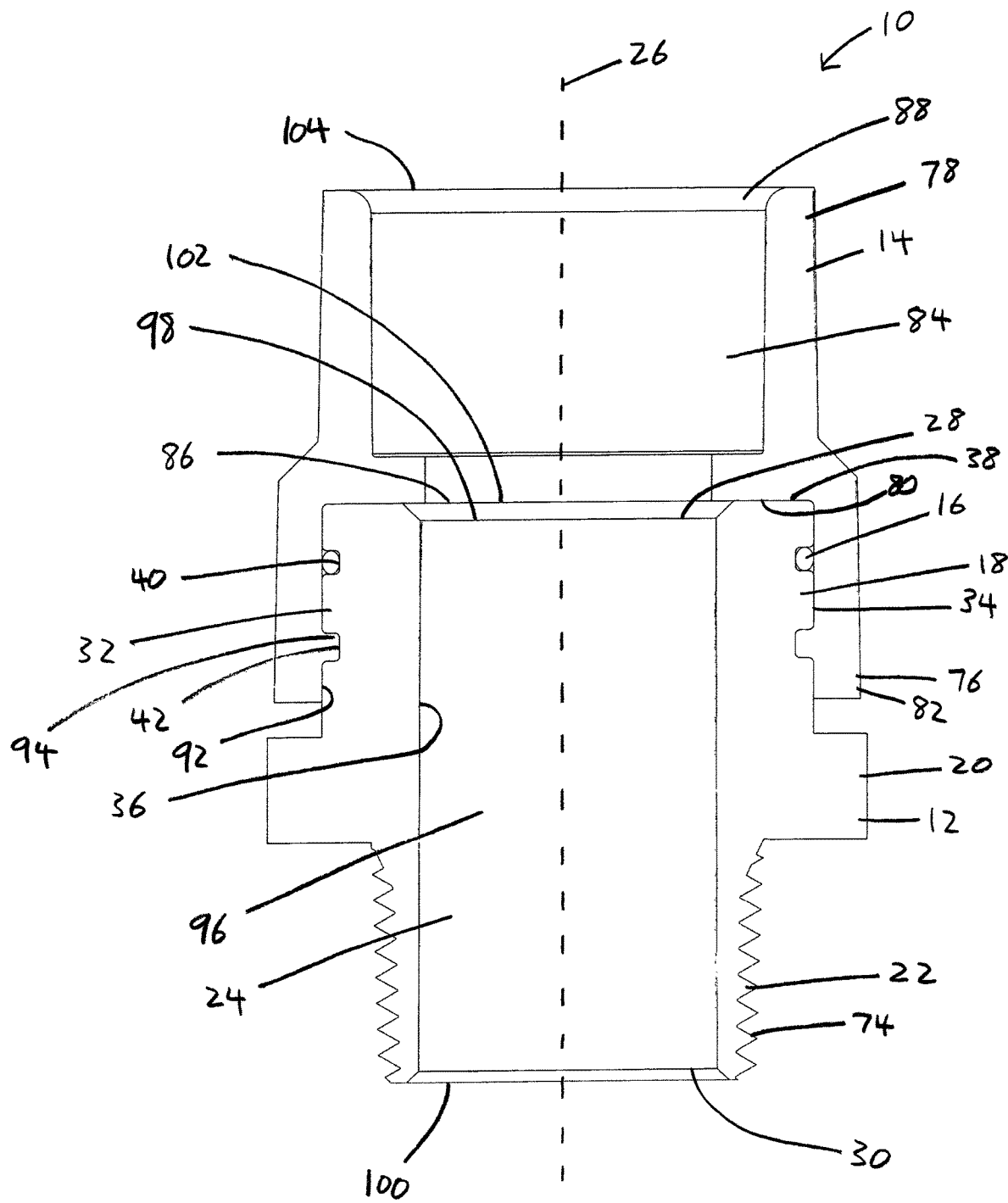
FIG. 11 is a cross-sectional view of the pipe fitting of FIG. 1, taken along line B-B' shown in FIG. 1.

As can be seen in FIGS. 1 and 2, the second body 14 has an engagement portion 76 and a cylindrical end portion 78. The cylindrical end portion 78 defines an internal passageway 84 that extends along the central axis 26 from a first open end 86 to a second open end 88, as shown in FIG. 11. The engagement portion 76 has a ring-shaped second interface surface 80 that surrounds the first open end 86 of the internal passageway 84, as is best shown in FIG. 9, and a cylindrical extension 82 that extends from the second interface surface 80 away from the cylindrical end portion 78.

The cylindrical extension 82 extends concentrically about the central axis 26, and has an inner extension surface 92 that faces radially inwardly. A circumferential finger 94 extends radially inwardly from the inner extension surface 92. As can be seen in FIG. 11, the inner extension surface 92 engages with the cylindrical outer surface 34 of the first body 12, with the first circumferential groove 40 receiving and engaging with the circumferential finger 94. The engagement of the first circumferential groove 40 with the circumferential finger 94 resists axial movement of the second body 14 relative to the first body 12. As can be seen in FIG. 11, the o-ring 16 is positioned within the second circumferential groove 42 and is compressed between the cylindrical wall 32 and the cylindrical extension 82 to provide a fluid tight seal therebetween.

Figure 9:
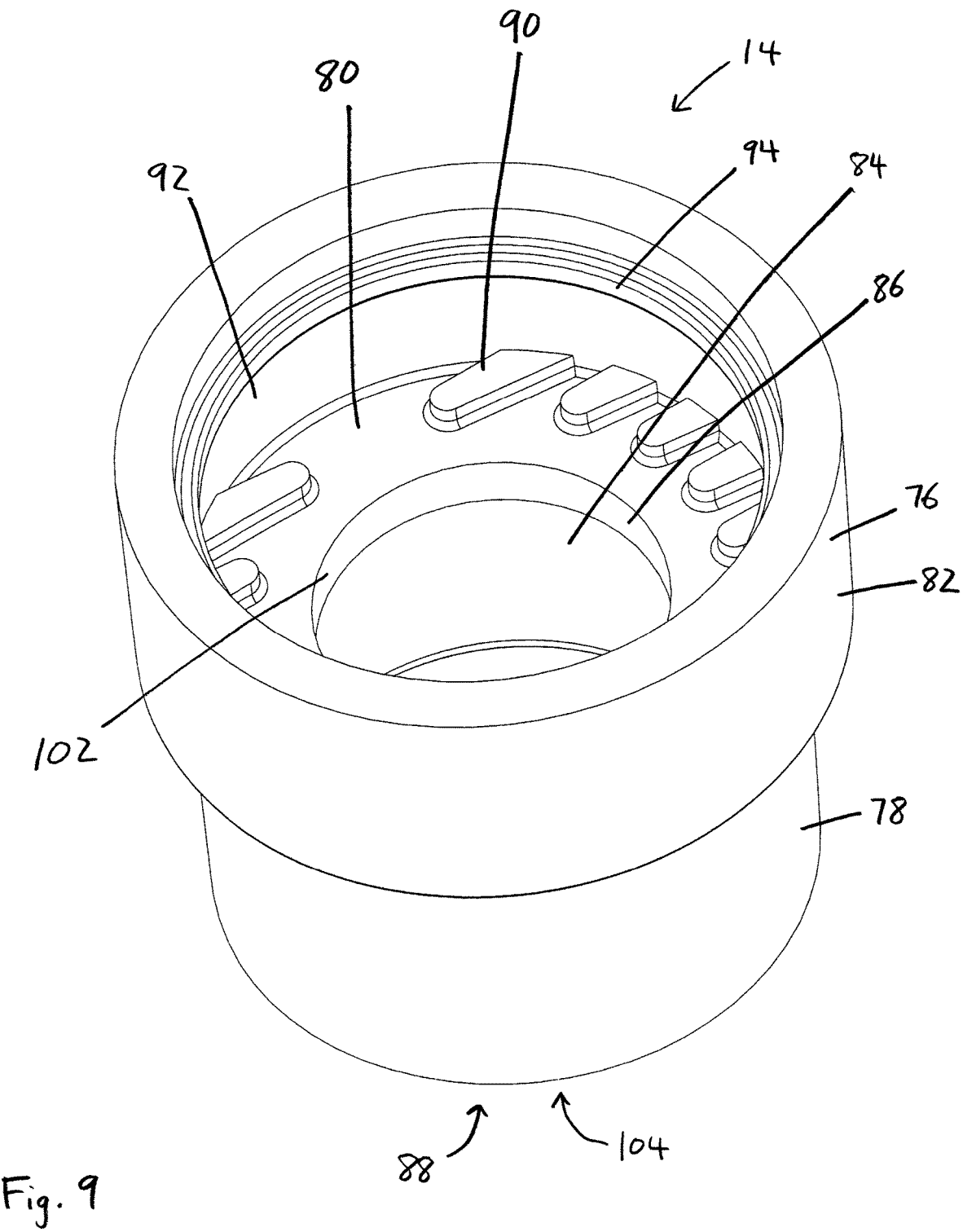
FIG. 9 is a perspective view of the second body shown in FIG. 2.
Figure 10:
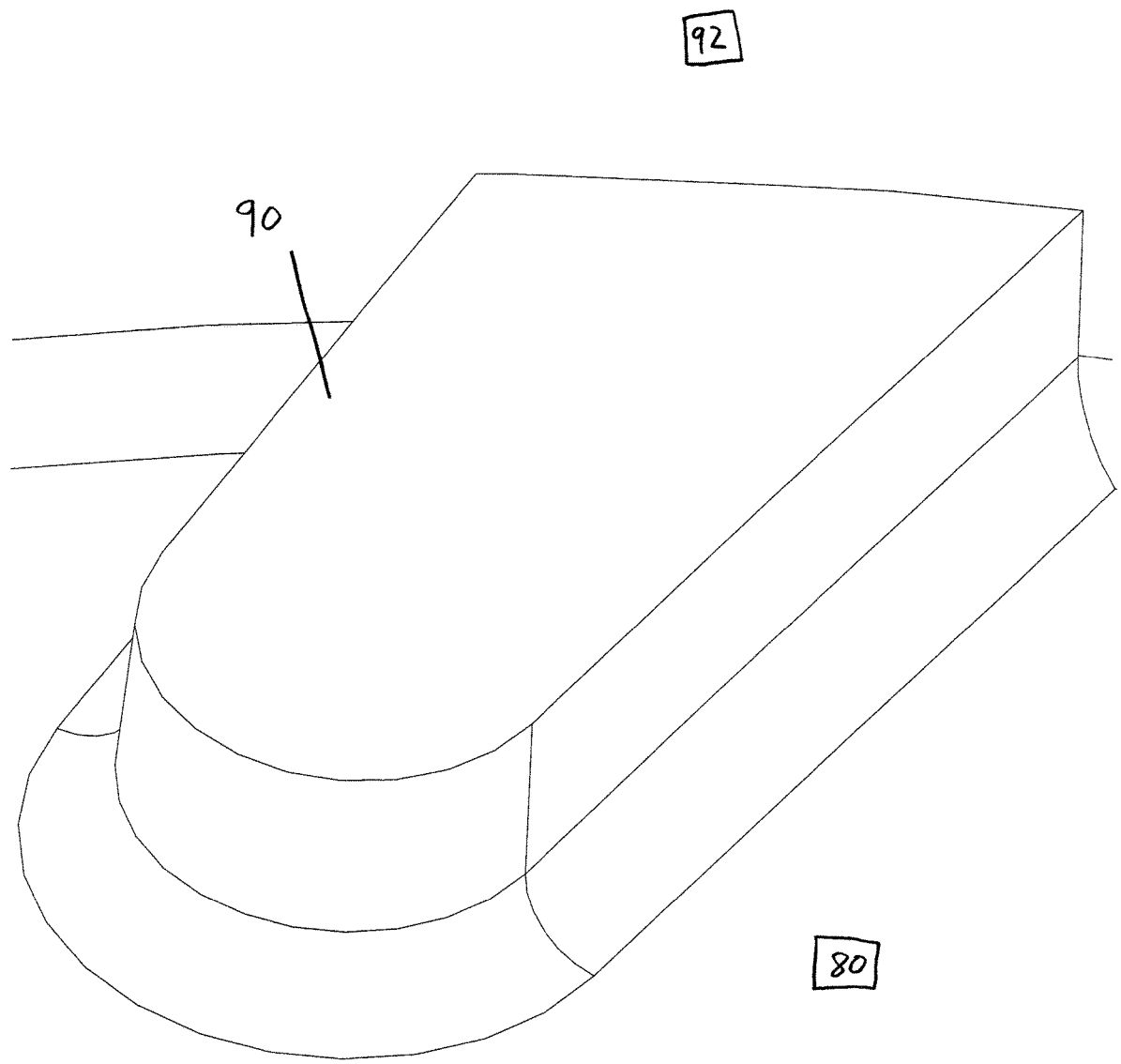
FIG. 10 is an enlarged view of an anti-rotation finger of the second body shown in FIG. 9.

As shown in FIG. 9, the second interface surface 80 has a plurality of anti-rotation fingers 90 that extend radially inwardly from the inner extension surface 92 towards the first open end 86 of the internal passageway 84. The anti-rotation fingers 90 each have a shape and size that corresponds to the shape and size of the groove cavity 60 of a corresponding one of the anti-rotation grooves 44. The second interface surface 80 of the second body 14 engages with the first interface surface 38 of the first body 12, with the anti-rotation fingers 90 each being received by and engaging with the corresponding anti-rotation grooves 44. The engagement of the anti-rotation fingers 90 with the anti-rotation grooves 44 resists rotation of the second body 14 relative to the first body 12 about the central axis 26.

As best shown in FIG. 11, the cylindrical passageway 24 of the first body 12 and the internal passageway 84 of the second body 14 together form a fluid flow passage 96 that extends through the pipe fitting 10, with the cylindrical passageway 24 forming a first portion of the fluid flow passage 96 and the internal passageway 84 forming a second portion of the fluid flow passage 96. The second open end 30 of the cylindrical passageway 24 forms a first end 100 of the fluid flow passage 96; the first open end 28 of the cylindrical passageway 24 forms a first internal opening 98 of the fluid flow passage 96; the first open end 86 of the internal passageway 84 forms a second internal opening 102 of the fluid flow passage 96 that is aligned with and in fluid communication with the first internal opening 98; and the second open end 88 of the internal passageway 84 forms a second end 104 of the fluid flow passage 96.

Preferably, the pipe fitting 10 is produced in the following manner. In a first step, the first body 12 is molded from a first polymeric material, for example by injection molding. Preferably, the first polymeric material is polyvinylidene fluoride containing glass reinforcing fibers. Once the first body 12 has hardened, in a second step the diaphragm gate is removed. In a third step the o-ring 16 is placed into the first circumferential groove 40. Once the o-ring 16 is in place, in a fourth step the second body 14 is overmolded over the interface portion 18 of the first body 12, for example by injection molding. Once the second body 14 has hardened, the diaphragm gate is removed. The second body 14 is formed from a second polymeric material that differs from the first polymeric material. Preferably, the second polymeric material is chlorinated polyvinyl chloride.

During the overmolding of the second body 14 over the interface portion 18 of the first body 12, the molten second polymeric material flows over the cylindrical outer surface 34 of the cylindrical wall 32, and into the second circumferential groove 42. The second polymeric material that surrounds the cylindrical outer surface 34 forms the cylindrical extension 82 of the second body 14, and the second polymeric material that fills the second circumferential groove 42 forms the circumferential finger 94. Because the cylindrical extension 82 is formed by overmolding over the cylindrical outer surface 34, the contour of the inner extension surface 92 of the cylindrical extension 82 precisely matches the contour of the cylindrical outer surface 34, and the contour of the circumferential finger 94 precisely matches the contour of the second circumferential groove 42, thereby forming a strong, leak resistant fit.

Figure 12:
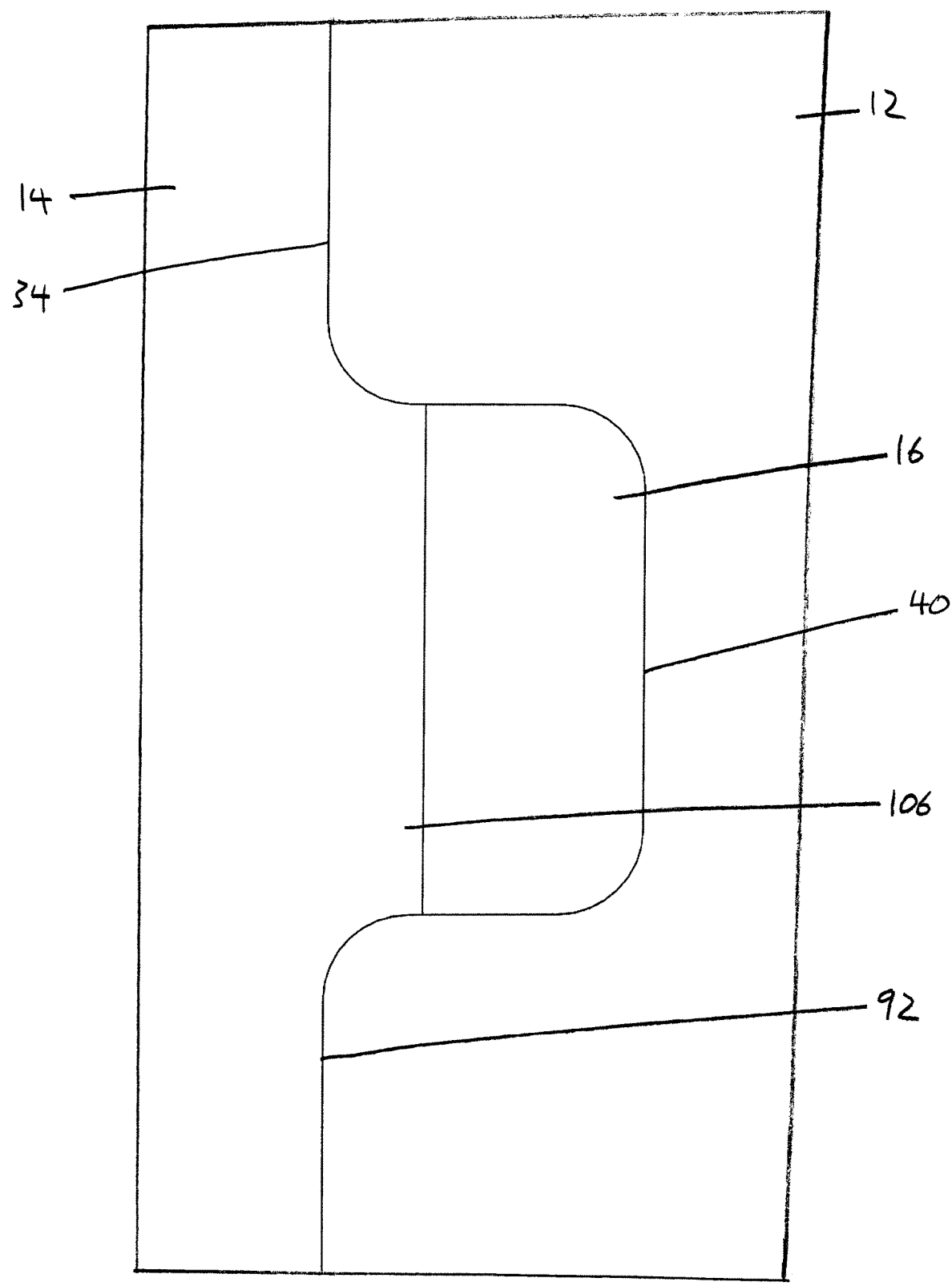
FIG. 12 is an enlarged cross-sectional view showing the o-ring positioned between the first body and the second body in the pipe fitting as shown in FIG. 11.

Preferably, the o-ring 16 is selected so that it does not completely fill the first circumferential groove 40, as shown in FIG. 12. This leaves space for the second polymeric material to flow into the first circumferential groove 40 during the overmolding, thereby forming a secondary circumferential finger 106 shown best in FIG. 12 that extends into the first circumferential groove 40 and abuts against the o-ring 16. As the second polymeric material is injected into the first circumferential groove 40, the o-ring 16 is compressed by the pressure of the second polymeric material. The compressed o-ring 16 forms a fluid tight seal between the secondary circumferential finger 106 and the first circumferential groove 40, and thus helps to prevent leaks. The engagement of the secondary circumferential finger 106 with the first circumferential groove 40 furthermore helps to resist axial movement of the second body 14 relative to the first body 12.

During the overmolding process, the second polymeric material also flows over the first interface surface 38, and into the anti-rotation grooves 44. The second polymeric material that covers the first interface surface 38 forms the second interface surface 80 of the second body 14, and the second polymeric material that fills the anti-rotation grooves 44 forms the anti-rotation fingers 90. Because the second interface surface 80 is formed by overmolding over the first interface surface 38, the contour of the second interface surface 80 precisely matches the contour of the first interface surface 38, and the contour of the anti-rotation fingers 90 precisely matches the contour of the anti-rotation grooves 44, thereby forming a strong, leak resistant fit.

Once the second body 14 hardens and the diaphragm gate is removed, the pipe fitting 10 is ready for use. The pipe fitting 10 is most preferably used as a composite transition fitting for fluidly connecting, via the fluid flow passage 96, a first fluid conduit formed from a metallic material and a second fluid conduit formed from a polymeric material. For example, as shown in FIG. 3, the pipe fitting 10 can be used to fluidly connect a pump 108 having a metallic (brass) threaded attachment or fitting 110 to a polymeric water distribution pipe 112. To connect the pipe fitting 10 to the metallic threaded attachment 110, the male threaded end portion 22 of the first body 12 is inserted into the female metallic threaded attachment 110, and the pipe fitting 10 is rotated, for example by a wrench or a similar tool that engages with the tool engagement portion 20, to thereby form a fluid tight threaded connection. To connect the pipe fitting 10 to the polymeric water distribution pipe 112, the polymeric water distribution pipe 112 is inserted into the first open end 86 of the internal passageway 84 of the second body 14. A water-tight seal is formed between the polymeric water distribution pipe 112 and the second body 14 by, for example, applying a solvent cement to form a chemical weld. Once the pipe fitting 10 is installed in place, water or other fluids can flow between the pump 108 and polymeric water distribution pipe 112 via the fluid flow passage 96 provided by the pipe fitting 10.

The pipe fitting 10 is thus able to fluidly connect a metallic component to a polymeric component, without incorporating any metallic materials into the pipe fitting 10 itself. This can help to reduce costs, as metallic parts such as machined brass alloy can be very expensive. Furthermore, the pipe fitting 10 is completely lead free, and can thus be used for potable water systems without raising concerns about lead contamination.

The first body 12 is preferably formed from polyvinylidene fluoride containing glass reinforcing fibers. This material is advantageous due to its resistance to chemicals and its ability to retain good mechanical properties at high temperatures. Furthermore, polyvinylidene fluoride has a low difference in coefficient of thermal expansion when compared to chlorinated polyvinyl chloride. This helps to prevent leaks when the pipe fitting 10 is subjected to cyclic thermal loading, for example when used in a hot and cold water system. In contrast, when dissimilar materials such as brass and chlorinated polyvinyl chloride are combined their wide spread in coefficients of thermal expansion can lead to a leak path between the materials when thermally loaded or resulting from thermocycling.

The construction of the pipe fitting 10 allows it to withstand various axial and torsional forces that may be experienced during installation and/or operation. For example, axial forces may occur from thermal expansion or contraction, operating pressures, water hammer or other pressure fluctuations. The strong mechanical connection that is created by molding the circumferential finger 94 and the secondary circumferential finger 106 into the first and second circumferential grooves 40, 42 allows the pipe fitting 10 to resist these axial forces, and prevent the second body 14 from being axially separated from the first body 12.

The pipe fitting 10 may also experience torsional forces that attempt to rotate the first body 12 relative to the second body 14, for example during the installation and/or removal of the threaded end portion 22 from a threaded attachment. The engagement of the anti-rotation fingers 90 with the anti-rotation grooves 44 allows the pipe fitting 10 to resist these torsional forces, and prevent the first body 12 from rotating relative to the second body 14.

The anti-rotation fingers 90 and the anti-rotation grooves 44 have a unique geometry that is designed to maximize surface area contact between the first body 12 and the second body 14, and to distribute the torsional forces created during installation and disassembly across the bearing area of the fitting 10. This in turn reduces stress concentrations, resulting in a robust fitting 10.

Preferably, the number, size, shape, depth 66, length, and/or width 64 of the anti-rotation grooves 44 and the anti-rotation fingers 90 is selected so that there is a relationship between the expected torsional forces (torque) experienced during installation and/or disassembly and the bearing area that is defined by the following formula: $T = C \times BA$.

In this formula T is torque, or the forces generated during installation. The bearing area is expressed as BA. The bearing area is the surface area of the anti-rotation features that are subjected to forces during installation. The bearing area is calculated as 50% of a sum of the vertical surface areas of the anti-rotation grooves 44, including the first side surfaces 48 and the second side surfaces 50 and the radii of the rounded groove end surfaces 52. This can be calculated using measuring tools within a 3-D CAD software package, measurements and hand calculations, or other equivalent means. C is a constant value that is maintained as fitting size, and thus installation forces, increase or decrease. The constant value C is preferably in a range from 2000 pounds per inch to 2400 pounds per inch, or between 2100 pounds per inch and 2200 pounds per inch, or between 2125 pounds per inch and 2135 pounds per inch, or about 2129 pounds per inch.

By way of example, the preferred bearing area of a pipe fitting 10 in accordance with the invention, wherein the pipe fitting 10 is expected to experience up to 600 inch pounds of torque during installation and the constant value is selected as 2129 pounds per inch, would be calculated as follows: $BA = T$ (600 inch pounds)$/C$ (2129 pounds per inch)$=0.2818$ square inches. The number, size, shape, depth 66, length, and/or width 64 of the anti-rotation grooves 44 and the anti-rotation fingers 90 for this fitting 10 would thus be selected so that the total bearing area was about 0.2818 square inches.

As mentioned above, the ratio of the width 64 and the depth 66 of the anti-rotation grooves 44 is preferably in a range from 1.45 to 1.55, or between 1.50 and 1.52, or most preferably about 1.516. Having a ratio between the width 64 and the depth 66 of about 1.516 helps to ensure that the anti-rotation grooves 44 and the anti-rotation fingers 90 have adequate strength to withstand the torsional forces present during installation and/or disassembly as well as use. For example, in some preferred embodiments the width 64 of the anti-rotation grooves 44 is about 0.0955 inches and the depth 66 is about 0.0630 inches, providing a width 64 to depth 66 ratio of about 1.516.

As mentioned above, each of the anti-rotation grooves 44 is spaced a radial distance 72 from the first internal opening 98, wherein the ratio of the radial distance 72 to the wall thickness 70 is preferably greater than 0.3, or between 0.3 and 0.5, or between 0.35 and 0.45, or most preferably about 0.395. The radial distance 72 that the anti-rotation grooves 44 are spaced from the first internal opening 98 provides an undisturbed concentric circle of the first polymeric material, preferably polyvinylidene fluoride, surrounding the first internal opening 98. This helps to maintain the integrity of the fitting 10 by ensuring a suitable ring of stronger polyvinylidene fluoride is adjacent to the fluid flow passage 96, rather than alternating between polyvinylidene fluoride and chlorinated polyvinyl chloride. Having the anti-rotation grooves 44 spaced from the first internal opening 98 also eliminates many potential leak paths. Having a ratio of the radial distance 72 to the wall thickness 70 of about 0.395 provides a balance between strength of the cylindrical wall 32 and strength of the anti-rotation features. A larger ratio would improve the strength of the cylindrical wall 32, but reduce the strength of the anti-rotation grooves 44 and the anti-rotation fingers 90 by reducing the bearing area. A lower ratio would reduce the strength of the cylindrical wall 32, but increase the strength of the anti-rotation grooves 44 and the anti-rotation fingers 90. In one exemplary embodiment, each of the anti-rotation grooves 44 is spaced a radial distance 72 from the first internal opening 98 of about 0.128 inches, and the wall thickness 70 of the cylindrical wall 32 is about 0.324 inches. The resulting ratio of the radial distance 72 to the wall thickness 70 is about 0.395.

A further advantage of the pipe fitting 10 in accordance with the present invention is that the threaded end portion 22 of the first body 12 is spaced from the cylindrical end portion 78 of the second body 14. As such, the shape and size of the threaded end portion 22 is not dependent on the shape and size of the cylindrical end portion 78, and the threaded end portion 22 and the cylindrical end portion 78 can be selected independently from one another. As described in more detail below, this provides increased options and flexibility during manufacturing of the pipe fitting 10.

As previously described, the second body 14 is preferably overmolded onto the interface portion 18 of the first body 12. The interface portion 18 can thus be described as an overlapping portion of the first body 12, because it overlaps with the second body 14. The tool engagement portion 20 and the threaded end portion 22 are spaced from the second body 14, and can thus be described as a non-overlapping portion of the first body 12. Similarly, the cylindrical extension 82 of the second body 14 is attached to the first body 12, and can thus be described as an attachment portion of the second body 14. Because the cylindrical end portion 78 of the second body 14 is spaced from the first body 12, it can be described as an extension portion of the second body 14.

This configuration of the pipe fitting 10, with the first body 12 having an overlapping portion and a non-overlapping portion and the second body 14 having an attachment portion and an extension portion, wherein the non-overlapping portion defines the first end 100 of the fluid flow passage 96 and the extension portion defines the second end 104 of the fluid flow passage 96, provides a number of advantages during manufacturing. For example, because the first end 100 of the fluid flow passage 96 does not overlap with the second body 14, the first end 100 can be selected to have any desired shape or configuration, including for example a male or female design of various sizes, without requiring any changes to the shape and size of the overlapping portion. As such, in a manufacturing process wherein a variety of different pipe fittings 10 are being produced with different sizes and shapes of the non-overlapping portion of the first body 12, the same mold can be used to overmold the second body 14 over each of the different first body 12 designs. This significantly simplifies the manufacturing process, and allows for a wide variety of pipe fitting 10 designs to be manufactured at relatively low cost.

Similarly, because the second end 104 of the fluid flow passage 96 does not overlap with the first body 12, the second end 104 can be selected to have any desired shape or configuration, including for example a spigot or a socket design of various sizes, without requiring any changes to the shape and size of the attachment portion. As such, a variety of different molds for the second body 14 could be used in conjunction with a variety of different molds for the first body 12, with the attachment portion of the second body 14 and the overlapping portion of the first body 12 remaining constant, and the extension portion of the second body 14 and the non-overlapping portion of the first body 12 varying. In this way, a wide variety of different configurations of the pipe fitting 10 could be manufactured relatively easily, including any suitable combination of male/female and socket/spigot of various sizes. For example, a pipe fitting 10 in accordance with the invention could incorporate a ¾ inch male threaded end portion 22 on the first body 12 with a 1 inch socket at the second open end 88 of the second body 14, or any other suitable combination.

Figure 13:
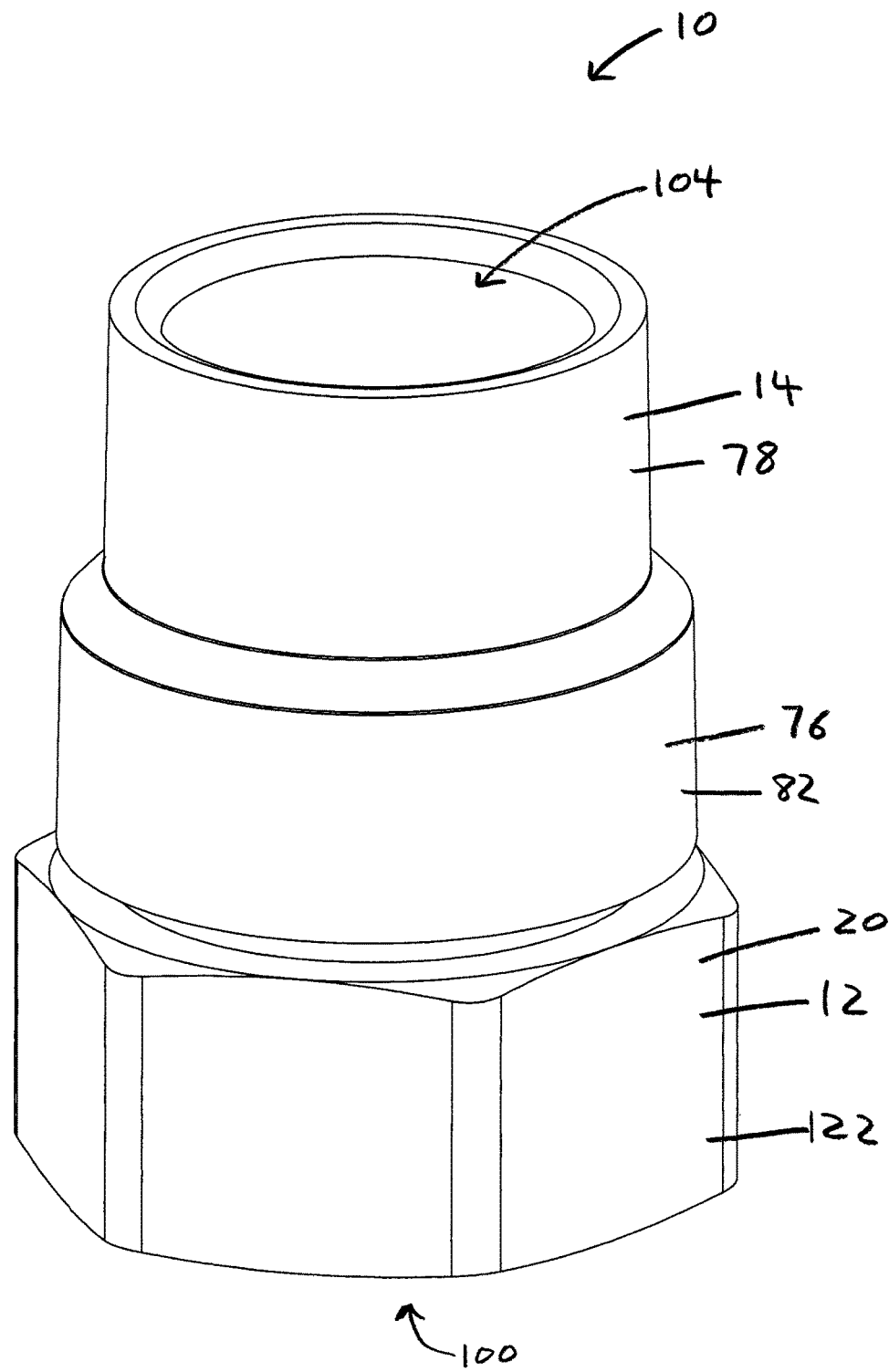
FIG. 13 is a perspective view of a pipe fitting in accordance with a second embodiment of the invention having a female threaded end portion.
Figure 14:
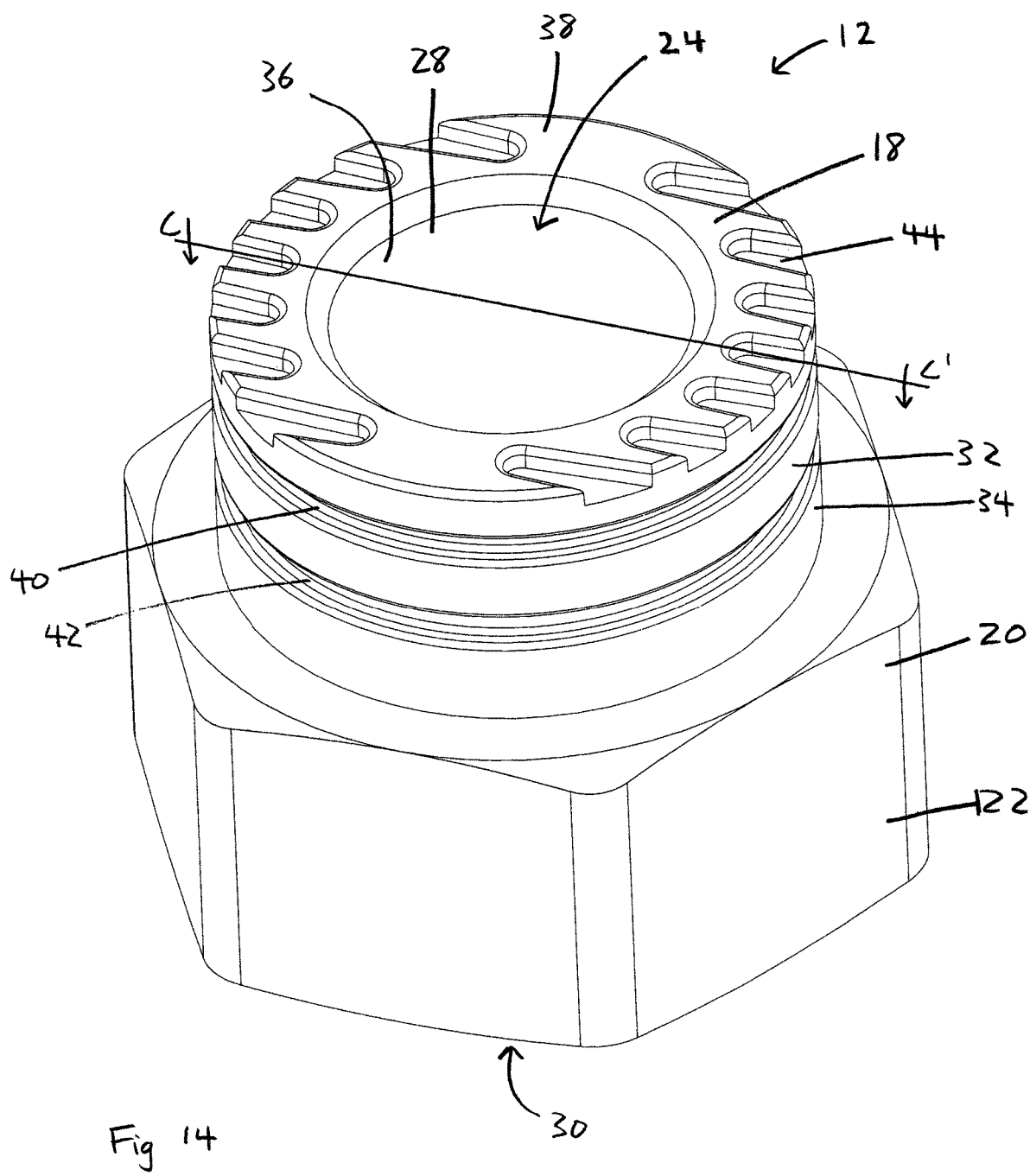
FIG. 14 is a perspective view of a first body of the pipe fitting shown in FIG. 13.
Figure 15:
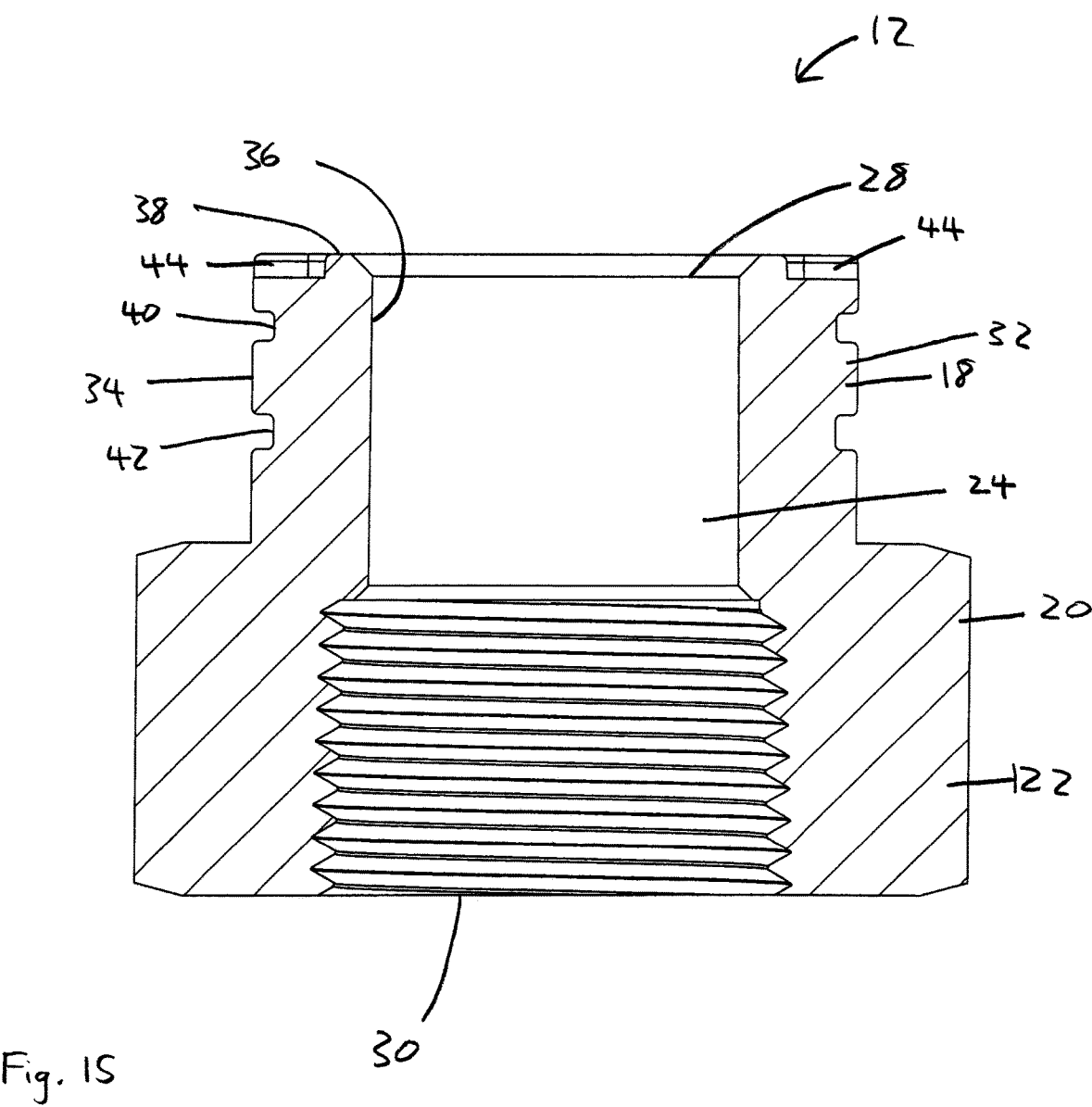
FIG. 15 is a cross-sectional view of the first body shown in FIG. 14, taken along line C-C' as shown in FIG. 14.

To illustrate just one of the many possible alternative configurations, a pipe fitting 10 in accordance with a second embodiment of the invention is shown in FIGS. 13 to 15. The pipe fitting 10 as shown in FIGS. 13 to 15 is identical to the pipe fitting 10 shown in FIGS. 1 to 12, with the only difference being that a threaded end portion 122 of the first body 12 is female instead of male. As the interface portion 18 of the first body 12 is unchanged, the same mold for the second body 14 could be used to produce both the pipe fitting shown in FIGS. 13 to 15 and the pipe fitting 10 shown in FIGS. 1 to 12.

It will be understood that, although various features of the invention have been described with respect to one or another of the embodiments of the invention, the various features and embodiments of the invention may be combined or used in conjunction with other features and embodiments of the invention as described and illustrated herein.

The pipe fitting 10 in accordance with the present invention is not limited to the particular construction shown in the drawings. For example, in alternative embodiments the anti-rotation grooves 44 could extend radially inwardly towards the central axis 26, rather than being parallel. The anti-rotation grooves 44 can be considered to be parallel when a longitudinal centerline 114 of each groove 44 is parallel with the longitudinal centerline 114 of the other grooves 44, as shown in FIG. 6. The anti-rotation grooves 44 could also have a different shape than the one shown in the drawings, and for example the groove end surface 52 could be flat instead of rounded; the bottom surface 54 could be rounded instead of flat; and the first and second side surfaces 48, 50 could be entirely flat, entirely rounded, angled upwardly or downwardly relative to the central axis 26, or have any other desired shape and orientation. It is preferable, though not required, that each anti-rotation groove 44 is substantially symmetric about its longitudinal centerline 114.

The anti-rotation grooves 44 and the anti-rotation fingers 90 are preferably in the line of draw of the mold opening, which allows the anti-rotation features to be molded. The anti-rotation features are also preferably designed to provide a gentle flow path for the molten polymer to flow into and fill the features. Rounded edges are preferably used to provide a favorable geometry for the overmolding operation. Although the pipe fitting 10 is preferably produced by injection molding the first body 12, placing the o-ring 16 in the first circumferential groove 40, and then overmolding the second body 14 by injection molding over the first body 12, any other suitable method of producing the pipe fitting 10 could also be used. The number of anti-rotation grooves 44 could also be higher or lower than the number shown in the drawings. The pipe fitting 10 could also have a higher number or a lower number of circumferential grooves 40, 42. In some alternative embodiments, the o-ring 16 could be omitted. In other embodiments, there could be more than one o-ring 16.

Although the first body 12 has been described as preferably being formed from polyvinylidene fluoride containing glass reinforcing fibers, a person skilled in the art would appreciate that other materials could be used instead. For example, the first body 12 could alternatively be formed from polyphenylene sulfide, polyvinyl chloride, chlorinated polyvinyl chloride, or polyphenylsulfone, with or without reinforcing fibers. The material from which the first body 12 is formed is preferably selected based on the expected operating conditions, including for example the type of material that the first body 12 will be connected to, the system pressure and temperature, and the fluid that will pass through the fluid flow passage 96. The first body 12 could also contain any suitable type of reinforcing fibers, including for example carbon, stainless steel, aramid, basalt, and/or polyester.

The second body 14 is also not limited to being formed from chlorinated polyvinyl chloride, as described in the preferred embodiments. Rather, any suitable material could be used including, for example, polyvinyl chloride, polyethylene, polypropylene, polyvinylidene fluoride, and/or cross-linked polyethylene.

Preferably, the first body 12 is produced using a diaphragm or disk gate at a location selected so that the first body 12 is free of weld lines. In a molded part the strength at weld lines is reduced significantly due to the lack of polymer chain entanglement. The degree of strength reduction is dependent on the weld line meeting angle. This technical concern is preferably eliminated with the use of a diaphragm or disk gate located at the end of the part, for example at the first open end 28 of the cylindrical passageway 24.

When a filler, such as glass, is added to a polymer, the result is an overall increase in material strength. This however is not the case at the knit or weld line. In these areas the strength is compromised due to the inability of the fibers to properly mesh. Elimination of the weld lines mitigates this issue.

Gas (air) can become trapped at the meeting of melt fronts in a traditionally gated polymer component. By gating at the end of the part, all gas with the potential to become trapped is pushed by the melt front to the end of the part where it is able to be vented to atmosphere through vents in the injection mold. The result is a component with uniformly distributed fibers and consistent mechanical strength throughout. Preferably, the second body 14 is also produced using a diaphragm or disk gate at a location selected so that the second body 14 is free of weld lines, such as at the center of the part, for example at the first open end 86 of the internal passageway 84.

Although this disclosure has described and illustrated certain preferred embodiments of the invention, it is to be understood that the invention is not restricted to these particular embodiments. Rather, the invention includes all embodiments which are functional, chemical, or mechanical equivalents of the specific embodiments and features that have been described and illustrated herein.

The invention claimed is:

1. A pipe fitting comprising:
   a first body and a second body that together at least partially define a fluid flow passage;

the first body defining a first portion of the fluid flow passage that extends from a first end of the fluid flow passage to a first internal opening;

the second body defining a second portion of the fluid flow passage that extends from a second internal opening to a second end of the fluid flow passage;

wherein the first body has a first interface surface that surrounds the first internal opening, the first interface surface having a plurality of anti-rotation grooves;

wherein the second body has a second interface surface that surrounds the second internal opening and engages with the first interface surface, the first internal opening being in fluid communication with the second internal opening, and the second interface surface having a plurality of anti-rotation fingers that are each received by and engage with a corresponding one of the anti-rotation grooves;

wherein rotation of the second body relative to the first body is resisted by the engagement of the anti-rotation fingers with the anti-rotation grooves;

wherein the first body has a wall extending about a central axis with an outer surface, an inner surface, and an end surface that spans between the outer surface and the inner surface;

wherein the inner surface defines at least part of the first portion of the fluid flow passage;

wherein the end surface comprises the first interface surface;

wherein the first internal opening comprises a circular opening;

wherein the central axis extends through a center of the circular opening;

wherein the end surface comprises a top surface that is substantially perpendicular to the central axis;

wherein each of the anti-rotation grooves has a first side surface, a second side surface, and a bottom surface;

wherein the first side surface and the second side surface each extend axially inwardly from the top surface, the first side surface being spaced from and substantially parallel to the second side surface;

wherein the bottom surface is spaced axially inwardly from the top surface and extends between the first side surface and the second side surface;

wherein the first side surface, the second side surface, and the bottom surface of each anti-rotation groove defines a groove cavity;

wherein the bottom surface of each of the anti-rotation grooves is substantially flat, and substantially parallel to the top surface;

wherein the first side surface and the second side surface each have a substantially flat portion;

wherein the substantially flat portion of the first side surface and the substantially flat portion of the second side surface are substantially perpendicular to the top surface; and wherein the first side surface and the second side surface each have a rounded transition portion that connects the substantially flat portion to the top surface.

2. The pipe fitting according to claim 1, wherein the anti-rotation grooves are oriented in a substantially parallel pattern on the first interface surface.

3. The pipe fitting according to claim 1, wherein the first interface surface has a bearing area where the anti-rotation grooves contact with the anti-rotation fingers to resist rotation of the second body about the central axis relative to the first body;

wherein the bearing area is related to an expected magnitude of torque applied to the pipe fitting during installation of the pipe fitting according to the following equation: $T = C \times BA$;

wherein T represents the expected magnitude of torque in pound inches, BA represents the bearing area in square inches, and C represents a constant in pounds per inch; and wherein the constant C is in a range from 2000 pounds per inch to 2400 pounds per inch.

4. The pipe fitting according to claim 3, wherein each of the anti-rotation grooves has a vertical surface area that includes the first side surface and the second side surface; and wherein the bearing area is calculated as 50% of a sum of the vertical surface areas of the anti-rotation grooves.

5. The pipe fitting according to claim 1, wherein each of the anti-rotation grooves has a width defined by a distance between the first side surface and the second side surface;

wherein each of the anti-rotation grooves has a depth defined by an axial distance of the bottom surface from the top surface; and wherein a ratio of the width to the depth is in a range from 1.45 to 1.55.

6. The pipe fitting according to claim 5, wherein the anti-rotation grooves each extend from the outer surface of the wall towards a central plane that contains the central axis and is substantially perpendicular to the anti-rotation grooves;

wherein the anti-rotation grooves each have a groove end surface that extends axially inwardly from the top surface to the bottom surface, and that extends between the first side surface and the second side surface;

wherein the groove end surface of each of the anti-rotation grooves is spaced from the central plane, and spaced from the circular opening;

wherein the anti-rotation grooves on a first side of the central plane are symmetrical relative to the anti-rotation grooves on a second side of the central plane; and wherein the groove end surface of each of the anti-rotation grooves is rounded.

7. The pipe fitting according to claim 6, wherein the wall is a cylindrical wall that extends concentrically about the central axis, with the outer surface being a cylindrical outer surface and the inner surface being a cylindrical inner surface of the cylindrical wall;

wherein the groove end surface of each of the anti-rotation grooves is spaced a radial distance from the cylindrical inner surface of the cylindrical wall;

wherein the cylindrical wall has a wall thickness defined by a distance between the cylindrical outer surface and the cylindrical inner surface; and wherein a ratio of the radial distance to the wall thickness is greater than 0.3.

8. The pipe fitting according to claim 7, wherein the ratio of the radial distance to the wall thickness is about 0.395.

9. The pipe fitting according to claim 7, wherein the second body has a cylindrical extension that extends concentrically about the central axis;

wherein the cylindrical extension has an inner extension surface that engages with the cylindrical outer surface of the cylindrical wall; and wherein the cylindrical wall has at least one circumferential groove that extends radially inwardly from the cylindrical outer surface.

10. The pipe fitting according to claim 9, wherein the at least one circumferential groove comprises a sealing groove that contains a resiliently compressible o-ring, the o-ring being configured to provide a fluid tight seal between the cylindrical wall and the cylindrical extension.

11. The pipe fitting according to claim 10, wherein the cylindrical extension has a circumferential finger that extends radially inwardly from the inner extension surface;
wherein the at least one circumferential groove receives and engages with the circumferential finger; and
wherein axial movement of the second body relative to the first body is resisted by the engagement of the circumferential finger with the at least one circumferential groove.

12. The pipe fitting according to claim 1, wherein the second end of the fluid flow passage is axially spaced from the first body;
wherein the first end of the fluid flow passage is axially spaced from the second body;
wherein the first body has a threaded end portion for threadedly engaging with a threaded attachment;
wherein the threaded end portion defines the first end of the fluid flow passage;
wherein the second body has a cylindrical end portion for engaging with a cylindrical attachment; and
wherein the cylindrical end portion defines the second end of the fluid flow passage.

13. The pipe fitting according to claim 1, wherein the first body is formed from a first polymeric material, and the second body is formed from a second polymeric material; and
wherein the first polymeric material differs from the second polymeric material.

14. The pipe fitting according to claim 13, wherein the first polymeric material comprises polyvinylidene fluoride, polyphenylene sulfide, polyvinyl chloride, chlorinated polyvinyl chloride, or polyphenylsulfone.

15. The pipe fitting according to claim 14, wherein the first polymeric material contains reinforcing fibers.

16. The pipe fitting according to claim 15, wherein the reinforcing fibers comprise glass fibers;
wherein the first polymeric material comprises polyvinylidene fluoride; and
wherein the second polymeric material comprises chlorinated polyvinyl chloride.

17. The pipe fitting according to claim 1, wherein the pipe fitting is a composite transition fitting for fluidly connecting, via the first portion and the second portion of the fluid flow passage, a first fluid conduit formed from a metallic material and a second fluid conduit formed from a polymeric material;
wherein the first body connects to the first fluid conduit at the first end of the fluid flow passage; and
wherein the second body connects to the second fluid conduit at the second end of the fluid flow passage.

18. A pipe fitting comprising:
a first body and a second body that together at least partially define a fluid flow passage;
the first body defining a first portion of the fluid flow passage that extends from a first end of the fluid low passage to a first internal opening;
the second body defining a second portion of the fluid flow passage that extends from a second internal opening to a second end of the fluid flow passage;
wherein the first body has a first interface surface that surrounds the first internal opening, the first interface surface having a plurality of anti-rotation grooves;
wherein the second body has a second interface surface that surrounds the second internal opening and engages with the first interface surface, the first internal opening being in fluid communication with the second internal opening, and the second interface surface having a plurality of anti-rotation fingers that are each received by and engage with a corresponding one of the anti-rotation grooves;
wherein rotation of the second body relative to the first body is resisted by the engagement of the anti-rotation fingers with the anti-rotation grooves;
wherein the first body has a wall extending about a central axis with an outer surface, an inner surface, and an end surface that spans between the outer surface and the inner surface;
wherein the inner surface defines at least part of the first portion of the fluid flow passage;
wherein the end surface comprises the first interface surface;
wherein the first internal opening comprises a circular opening;
wherein the central axis extends through a center of the circular opening;
wherein the end surface comprises a top surface that is substantially perpendicular to the central axis;
wherein each of the anti-rotation grooves has a first side surface, a second side surface, and a bottom surface;
wherein the first side surface and the second side surface each extend axially inwardly from the top surface, the first side surface being spaced from and substantially parallel to the second side surface;
wherein the bottom surface is spaced axially inwardly from the top surface and extends between the first side surface and the second side surface;
wherein the first side surface, the second side surface, and the bottom surface of each anti-rotation groove defines a groove cavity;
wherein the anti-rotation grooves each extend from the outer surface of the wall towards a central plane that contains the central axis and is substantially perpendicular to the anti-rotation grooves;
wherein the anti-rotation grooves each have a groove end surface that extends axially inwardly from the top surface to the bottom surface, and that extends between the first side surface and the second side surface;
wherein the groove end surface of each of the anti-rotation grooves is spaced from the central plane, and spaced from the circular opening;
wherein the anti-rotation grooves on a first side of the central plane are symmetrical relative to the anti-rotation grooves on a second side of the central plane; and
wherein the groove end surface of each of the anti-rotation grooves is rounded.

19. The pipe fitting according to claim 18, wherein each of the anti-rotation grooves has a width defined by a distance between the first side surface and the second side surface;
wherein each of the anti-rotation grooves has a depth defined by an axial distance of the bottom surface from the top surface; and
wherein a ratio of the width to the depth is in a range from 1.45 to 1.55.

20. The pipe fitting according to claim 18, wherein the wall is a cylindrical wall that extends concentrically about the central axis, with the outer surface being a cylindrical outer surface and the inner surface being a cylindrical inner surface of the cylindrical wall;

wherein the groove end surface of each of the anti-rotation grooves is spaced a radial distance from the cylindrical inner surface of the cylindrical wall;

wherein the cylindrical wall has a wall thickness defined by a distance between the cylindrical outer surface and the cylindrical inner surface; and wherein a ratio of the radial distance to the wall thickness is greater than 0.3.

21. The pipe fitting according to claim 20, wherein the ratio of the radial distance to the wall thickness is about 0.395.

22. The pipe fitting according to claim 20, wherein the second body has a cylindrical extension that extends concentrically about the central axis;

wherein the cylindrical extension has an inner extension surface that engages with the cylindrical outer surface of the cylindrical wall; and wherein the cylindrical wall has at least one circumferential groove that extends radially inwardly from the cylindrical outer surface.

23. The pipe fitting according to claim 18, wherein the first body is formed from a first polymeric material, and the second body is formed from a second polymeric material; and wherein the first polymeric material differs from the second polymeric material.

24. The pipe fitting according to claim 23, wherein the first polymeric material comprises polyvinylidene fluoride, polyphenylene sulfide, polyvinyl chloride, chlorinated polyvinyl chloride, or polyphenylsulfone.

25. The pipe fitting according to claim 24, wherein the first polymeric material contains reinforcing fibers.

26. The pipe fitting according to claim 25, wherein the reinforcing fibers comprise glass fibers;

wherein the first polymeric material comprises polyvinylidene fluoride; and wherein the second polymeric material comprises chlorinated polyvinyl chloride.

\* \* \* \* \*